US009625121B2

(12) United States Patent
Fukai et al.

(10) Patent No.: US 9,625,121 B2

(45) Date of Patent: Apr. 18, 2017

(54) LIGHT EMITTING DEVICE, VEHICLE HEADLAMP, ILLUMINATION DEVICE, AND VEHICLE

(75) Inventors: Yasuo Fukai, Osaka (JP); Yoshiyuki Takahira, Osaka (JP); Koji Takahashi, Osaka (JP); Yosuke Maemura, Osaka (JP); Yoshitaka Tomomura, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 890 days.

(21) Appl. No.: 13/297,008

(22) Filed: Nov. 15, 2011

(65) Prior Publication Data

US 2012/0140504 A1 Jun. 7, 2012

(30) Foreign Application Priority Data

Dec. 1, 2010 (JP) ................................ 2010-268677

(51) Int. Cl.

*B60Q 1/00* (2006.01)

*F21V 9/16* (2006.01)

(Continued)

(52) U.S. Cl.

CPC ............ *F21V 9/16* (2013.01); *F21S 48/1145* (2013.01); *F21S 48/328* (2013.01)

(58) Field of Classification Search

CPC ......... F21Y 2101/025; F21Y 2103/006; F21Y 2113/00; F21S 48/1317; F21V 29/002; F21V 3/0463; F21V 29/008; F21V 3/0481

(Continued)

(56) References Cited

U.S. PATENT DOCUMENTS 5,535,230 A 7/1996 Abe 5,962,971 A 10/1999 Chen (Continued)

FOREIGN PATENT DOCUMENTS

CN 1676986 10/2005

CN 101629689 1/2010

(Continued)

OTHER PUBLICATIONS

Takahashi, K. et al. "'Laser Headlight' for Next Generation Automotive Lighting." Proceedings for the 9$^{th}$ International Symposium on Automotive Lighting Darmstadt, Germany. Sep. 26-28, 2011. pp. 271-283 with cover page.

(Continued)

*Primary Examiner* — Andrew Coughlin

*Assistant Examiner* — Alexander Garlen

(74) *Attorney, Agent, or Firm* — Morrison & Foerster LLP

(57) ABSTRACT

A headlamp 1 includes (i) a laser element 2 for emitting a laser beam, (ii) a light emitting section 4, including a sealing material made from an inorganic material, for emitting fluorescence upon receiving the laser beam emitted from the laser element 2, and (iii) a heat sink 7 for releasing, via a contact surface of the heat sink 7 which contact surface is in contact with the light emitting section 4, heat generated in the light emitting section 4 in response to the laser beam emitted onto the light emitting section 4, the light emitting section 4 existing within a range which is determined on the basis of the contact surface and with which desired heat releasing efficiency is obtained.

19 Claims, 15 Drawing Sheets

(51) Int. Cl.
*F21V 29/00* (2015.01)
*F21S 8/10* (2006.01)

(58) Field of Classification Search
USPC .......... 362/84, 260, 509, 510, 516, 547, 294
See application file for complete search history.

(56) References Cited

U.S. PATENT DOCUMENTS

| | | | | |
|---|---|---|---|---|
| 6,412,971 | B1 * | 7/2002 | Wojnarowski et al. | 362/241 |
| 7,084,435 | B2 | 8/2006 | Sugimoto et al. | |
| 7,131,759 | B2 | 11/2006 | Ishida et al. | |
| 7,144,131 | B2 * | 12/2006 | Rains | 362/231 |
| 7,165,871 | B2 * | 1/2007 | Takeda et al. | 362/538 |
| 7,168,837 | B2 | 1/2007 | Ishida et al. | |
| 7,232,247 | B2 | 6/2007 | Yatsuda et al. | |
| 7,282,748 | B2 | 10/2007 | Takeda et al. | |
| 7,382,091 | B2 | 6/2008 | Chen et al. | |
| 7,388,232 | B2 | 6/2008 | Suehiro et al. | |
| 7,810,954 | B2 * | 10/2010 | Kolodin | 362/277 |
| 8,342,720 | B2 | 1/2013 | Harada et al. | |
| 8,348,458 | B2 | 1/2013 | Holten et al. | |
| 2001/0028565 | A1 | 10/2001 | Ishida | |
| 2002/0015308 | A1 | 2/2002 | Naganawa et al. | |
| 2003/0080691 | A1 | 5/2003 | Yasuda et al. | |
| 2004/0120155 | A1 * | 6/2004 | Suenaga | 362/362 |
| 2004/0145895 | A1 * | 7/2004 | Ouderkirk et al. | 362/260 |
| 2004/0184279 | A1 | 9/2004 | Molto et al. | |
| 2004/0223337 | A1 | 11/2004 | Ishida | |
| 2005/0105301 | A1 | 5/2005 | Takeda et al. | |
| 2005/0157508 | A1 | 7/2005 | Takeda et al. | |
| 2005/0231971 | A1 | 10/2005 | Ishida | |
| 2005/0270775 | A1 | 12/2005 | Harbers et al. | |
| 2006/0139926 | A1 | 6/2006 | Morioka et al. | |
| 2006/0279950 | A1 | 12/2006 | Hama et al. | |
| 2007/0080362 | A1 | 4/2007 | Scotch et al. | |
| 2007/0201241 | A1 | 8/2007 | Komatsu | |
| 2008/0007961 | A1 | 1/2008 | Mochizuki et al. | |
| 2008/0239746 | A1 | 10/2008 | Wuller et al. | |
| 2009/0003400 | A1 | 1/2009 | Nagahama et al. | |
| 2009/0046474 | A1 | 2/2009 | Sato et al. | |
| 2009/0231866 | A1 | 9/2009 | Yamamura | |
| 2009/0231874 | A1 | 9/2009 | Kishimoto et al. | |
| 2009/0273918 | A1 | 11/2009 | Falicoff et al. | |
| 2010/0008099 | A1 | 1/2010 | Inoue et al. | |
| 2010/0102199 | A1 | 4/2010 | Negley et al. | |
| 2010/0128463 | A1 * | 5/2010 | Kim et al. | 362/84 |
| 2010/0232173 | A1 | 9/2010 | Ohno et al. | |
| 2011/0085343 | A1 | 4/2011 | Ohno et al. | |
| 2011/0085352 | A1 | 4/2011 | Ito et al. | |
| 2011/0215701 | A1 * | 9/2011 | Tong et al. | 313/46 |
| 2011/0248624 | A1 * | 10/2011 | Kishimoto et al. | 313/483 |
| 2011/0280031 | A1 * | 11/2011 | Luger et al. | 362/520 |
| 2012/0068630 | A1 * | 3/2012 | Li et al. | 315/362 |
| 2012/0104934 | A1 * | 5/2012 | Fukai et al. | 313/498 |
| 2012/0106183 | A1 | 5/2012 | Takahashi | |
| 2012/0106188 | A1 | 5/2012 | Takahashi et al. | |
| 2012/0106189 | A1 | 5/2012 | Takahashi et al. | |
| 2012/0163009 | A1 | 6/2012 | Nakazato et al. | |
| 2012/0224384 | A1 | 9/2012 | Takahira et al. | |
| 2013/0003403 | A1 | 1/2013 | Takahira et al. | |

FOREIGN PATENT DOCUMENTS

| | | |
|---|---|---|
| DE | 10 2005 041 234 | 3/2007 |
| DE | 10 2007 008 994 | 9/2007 |
| DE | 10 2009 053 581 | 3/2011 |
| EP | 2 280 215 | 2/2011 |
| JP | 7-282609 | 10/1995 |
| JP | 7-318998 | 12/1995 |
| JP | 2002-87153 | 3/2002 |
| JP | 2003-295319 | 10/2003 |
| JP | 2004-6204 | 1/2004 |
| JP | 2004-231179 | 8/2004 |
| JP | 2004-241142 | 8/2004 |
| JP | 2004-327361 | 11/2004 |
| JP | 2005-150041 | 6/2005 |
| JP | 2005-205195 | 8/2005 |
| JP | 2006-210887 | 8/2006 |
| JP | 2006-253019 | 9/2006 |
| JP | 2007-16171 | 1/2007 |
| JP | 2007-27688 | 2/2007 |
| JP | 2007-30570 | 2/2007 |
| JP | 2007-142173 | 6/2007 |
| JP | 2007-200782 | 8/2007 |
| JP | 2008-13014 | 1/2008 |
| JP | 2008-227042 | 9/2008 |
| JP | 2009-9898 | 1/2009 |
| JP | 2009-48786 | 3/2009 |
| JP | 2009-513003 | 3/2009 |
| JP | 2009-67083 | 4/2009 |
| JP | 2009-96250 | 5/2009 |
| JP | 2009-129683 | 6/2009 |
| JP | 2009-266437 | 11/2009 |
| JP | 2009-302186 | 12/2009 |
| JP | 2010-86815 | 4/2010 |
| JP | 2010-140663 | 6/2010 |
| JP | 2010-153241 | 7/2010 |
| JP | 2010-198805 | 9/2010 |
| JP | 2010-212148 | 9/2010 |
| JP | 2010-212615 | 9/2010 |
| JP | 2010-232044 | 10/2010 |
| JP | 2011-21062 | 2/2011 |
| TW | 200604466 | 2/2006 |
| WO | WO-2007/105647 | 9/2007 |
| WO | WO-2009/145298 | 12/2009 |
| WO | WO-2010/116305 | 10/2010 |

OTHER PUBLICATIONS

U.S. Appl. No. 13/280,572, filed Oct. 25, 2011.
U.S. Appl. No. 13/284,487, filed Oct. 28, 2011.
U.S. Appl. No. 13/284,523, filed Oct. 28, 2011.
U.S. Appl. No. 13/407,366, filed Feb. 28, 2012.
U.S. Appl. No. 13/533,550, filed Jun. 26, 2012.
Takahashi et al., U.S. Office Action mailed Aug. 8, 2013, directed to U.S. Appl. No. 13/284,523; 17 pages.
Takahashi et al., U.S. Office Action mailed Jun. 11, 2013, directed to U.S. Appl. No. 13/284,487; 13 pages.
Takahashi et al., U.S. Notice of Allowance mailed Nov. 20, 2013, directed to U.S. Appl. No. 13/284,487; 13 pages.
Takahashi, U.S. Notice of Allowance mailed Feb. 21, 2014, directed to U.S. Appl. No. 13/280,572; 10 pages.
Takahashi et al., U.S. Notice of Allowance mailed Jan. 27, 2014, directed to U.S. Appl. No. 13/284,523; 8 pages.
Takahira et al., U.S. Office Action mailed Jun. 13, 2014, directed to U.S. Appl. No. 13/407,366; 15 pages.
Takahira et al., U.S. Office Action mailed Jul. 1, 2014, directed to U.S. Appl. No. 13/533,550; 7 pages.
Takahira et al., U.S. Office Action mailed Dec. 29, 2014, directed to U.S. Appl. No. 13/533,550; 9 pages.
Search Report dated May 15, 2015, directed to EP Application No. 12004832.7; 5 pages.

* cited by examiner

LIGHT EMITTING DEVICE, VEHICLE HEADLAMP, ILLUMINATION DEVICE, AND VEHICLE

This Nonprovisional application claims priority under 35 U.S.C. §119(a) on Patent Application No. 2010-268677 filed in Japan on Dec. 1, 2010, the entire contents of which are hereby incorporated by reference.

TECHNICAL FIELD

The present invention relates to (i) a light emitting device capable of preventing, with a simple configuration, an increase in a temperature of a light emitting section, (ii) a vehicle headlamp (headlight) including the light emitting device, (iii) an illumination device including the light emitting device, and (iv) a vehicle including the light emitting device.

BACKGROUND ART

In recent years, a lot of research has been done for a light emitting device which generates incoherent illumination light by emitting, onto a light emitting section including a fluorescent material, excitation light generated by an excitation light source such as a semiconductor light emitting element, e.g., a light emitting diode (LED) or a semiconductor laser (LD: Laser Diode).

An example of a technique relating to such a light emitting device is disclosed by Patent Literature 1.

A light source device of Patent Literature 1 includes (i) a light emitting device capable of preventing a reduction in luminous efficiency and maintaining its performance for a long term and (ii) a light source device including a plurality of light emitting devices. The light source device of Patent Literature 1 moves a fluorescent material layer so as to shift a position of the fluorescent material layer which position is irradiated with excitation light, for the purpose of preventing an increase in a temperature of a fluorescent material.

CITATION LIST

Patent Literature 1

Japanese Patent Application Publication, Tokukai, No. 2010-86815 A (Publication Date: Apr. 15, 2010)

SUMMARY OF INVENTION

Technical Problem

However, the conventional technique has the following problems.

The light source device of Patent Literature 1 moves the fluorescent material layer so as to shift the position of the fluorescent material layer which position is irradiated with the excitation light, for the purpose of preventing an increase in the temperature of the fluorescent material. Therefore, the light source device of Patent Literature 1 needs a driving section for shifting the position irradiated with light. This causes a problem of an increase in electric power consumption. Furthermore, because the light source device of Patent Literature 1 includes the driving section, a control section for controlling the driving section, and the like, the light source device of Patent Literature 1 involves a problem of complexity in the configuration of the light source device.

The present invention was made in order to solve the foregoing problems, and an object of the present invention is to provide (i) a light emitting device capable of preventing, with a simple configuration, an increase in a temperature of a light emitting section, (ii) a vehicle headlamp including the light emitting device, (iii) an illumination device including the light emitting device, and (iv) a vehicle including the light emitting device.

Solution to Problem

In order to attain the foregoing object, a light emitting device of the present invention includes: an excitation light source for emitting excitation light; a light emitting section, including a sealing material made from an inorganic material, for emitting fluorescence upon receiving the excitation light emitted from the excitation light source; and a heat releasing section for releasing, via a contact surface of the heat releasing section which contact surface is in contact with the light emitting section, heat generated in the light emitting section in response to the excitation light emitted onto the light emitting section, the light emitting section existing within a range which is determined on the basis of the contact surface and with which desired heat releasing efficiency is obtained.

According to the above configuration, the heat releasing section releases, via the contact surface which is in contact with the light emitting section, the heat generated in the light emitting section in response to the excitation light emitted onto the light emitting section. Further, the light emitting section exists within the range which is determined on the basis of the contact surface and with which desired heat releasing efficiency is obtained. In other words, by causing the light emitting section to exist within the range which is determined on the basis of the contact surface and with which desired heat releasing efficiency is obtained, it is possible to allow the heat releasing section to efficiently release, via the contact surface, the heat generated in the light emitting section. Note that the sealing material of the light emitting section is made from the inorganic material. Therefore, this sealing material would not be deteriorated due to heat, unlike a sealing material made from an organic material.

With this, the light emitting device of the present invention can solve the above-described conventional problems. Specifically, the light emitting device of the present invention does not need to move the light emitting section so as to shift a position of the light emitting section which position is irradiated with the excitation light, for the purpose of preventing an increase in a temperature of the light emitting section. Namely, the light emitting device of the present invention can prevent an increase in the temperature of the light emitting section without use of a driving section for shifting the position of the light emitting section which position is irradiated with the excitation light. This makes it possible to reduce electric power consumption of the light emitting device of the present invention as compared with the conventional light emitting device, thereby reducing economical burden on a user of the light emitting device of the present invention.

In addition, the light emitting device of the present invention does not need the driving section, the control section for driving the driving section, or the like. Therefore, with a simple configuration, the light emitting device of the present invention can prevent an increase in the temperature of the light emitting section, and accordingly can prevent a reduction in the luminous efficiency which reduction is caused by the increase in the temperature of the light emitting section. Therefore, the light emitting device of the present invention can provide a user and a supplier of the light emitting device with a lot of merits such as a simple device layout, weight reduction, a reduction in design cost and manufacturing cost, and economical price.

As described above, being configured as above, the light emitting device of the present invention can prevent, with a simple configuration, an increase in the temperature of the light emitting section, and can solve the conventional problems.

In order to attain the foregoing object, a vehicle of the present invention includes a vehicle headlamp, the vehicle headlamp including: an excitation light source for emitting excitation light; a light emitting section, including a sealing material made from an inorganic material, for emitting fluorescence upon receiving the excitation light emitted from the excitation light source; a reflecting mirror having a reflecting curved surface for reflecting the fluorescence emitted from the light emitting section; and a heat releasing section for releasing, via a contact surface of the heat releasing section which contact surface is in contact with the light emitting section, heat generated in the light emitting section in response to the excitation light emitted onto the light emitting section, the light emitting section existing within a range which is determined on the basis of the contact surface and with which desired heat releasing efficiency is obtained, and the vehicle headlamp being mounted in the vehicle so that the reflecting curved surface is located on a lower side in a vertical direction.

According to the above configuration, the vehicle of the present invention can prevent, with a simple configuration, an increase in the temperature of the light emitting section. Further, according to the above configuration, it is possible to provide a vehicle capable of solving the conventional problems.

Advantageous Effects of Invention

As described above, a light emitting device of the present invention includes: an excitation light source for emitting excitation light; a light emitting section, including a sealing material made from an inorganic material, for emitting fluorescence upon receiving the excitation light emitted from the excitation light source; and a heat releasing section for releasing, via a contact surface of the heat releasing section which contact surface is in contact with the light emitting section, heat generated in the light emitting section in response to the excitation light emitted onto the light emitting section, the light emitting section existing within a range which is determined on the basis of the contact surface and with which desired heat releasing efficiency is obtained.

As described above, in a vehicle of the present invention, the vehicle headlamp is configured so as to include: an excitation light source for emitting excitation light; a light emitting section, including a sealing material made from an inorganic material, for emitting fluorescence upon receiving the excitation light emitted from the excitation light source; a reflecting mirror having a reflecting curved surface for reflecting the fluorescence emitted from the light emitting section; and a heat releasing section for releasing, via a contact surface of the heat releasing section which contact surface is in contact with the light emitting section, heat generated in the light emitting section in response to the excitation light emitted onto the light emitting section, the light emitting section existing within a range which is determined on the basis of the contact surface and with which desired heat releasing efficiency is obtained, and the vehicle headlamp being mounted in the vehicle so that the reflecting curved surface is located on a lower side in a vertical direction.

Therefore, the present invention can provide (i) a light emitting device capable of preventing, with a simple configuration, an increase in a temperature of a light emitting section and (ii) a vehicle including the light emitting device.

Figure 3:
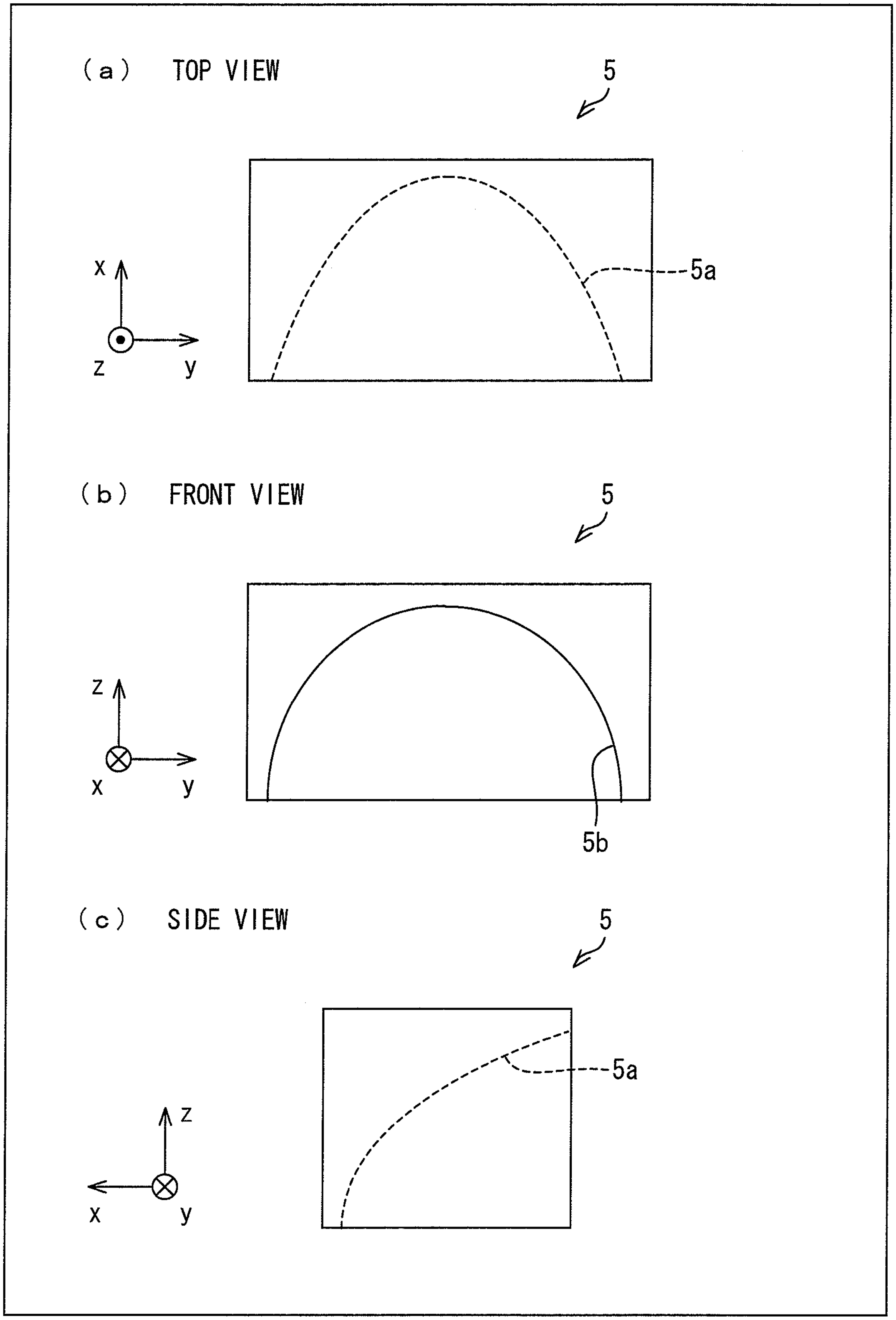

(a) of FIG. 3 is a top view of the parabolic mirror, (b) of FIG. 3 is a front view of the parabolic mirror, and (c) of FIG. 3 is a side view of the parabolic mirror.

Figure 4:
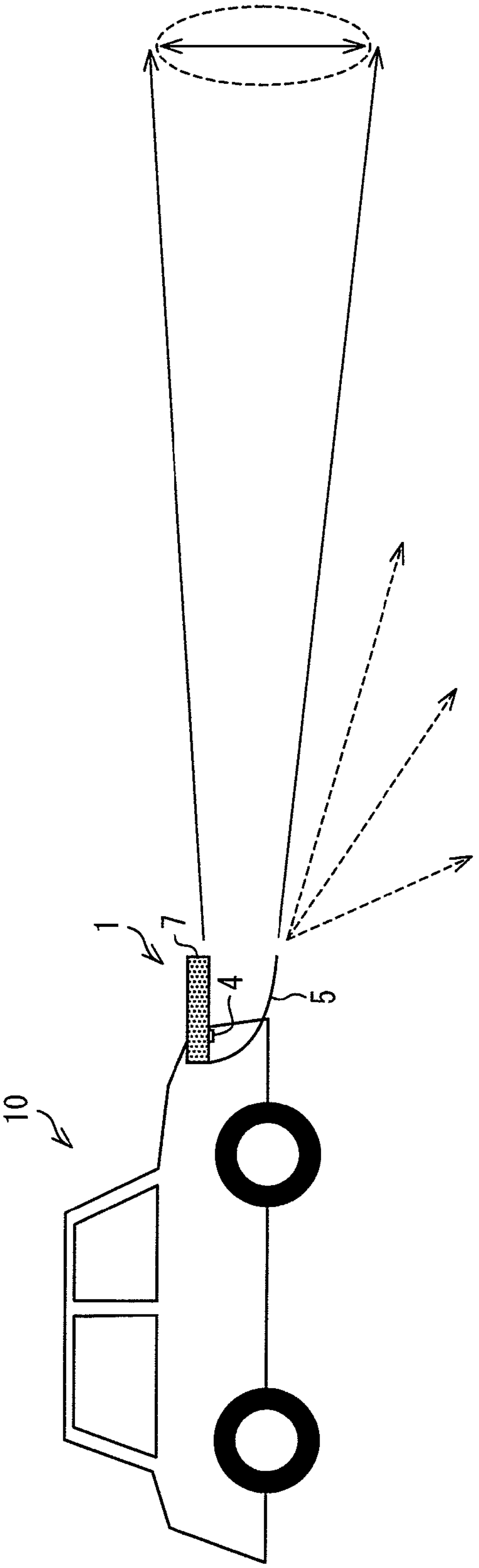

FIG. 4 is a view conceptually illustrating an orientation of a headlamp mounted in an automobile.

Figure 5:
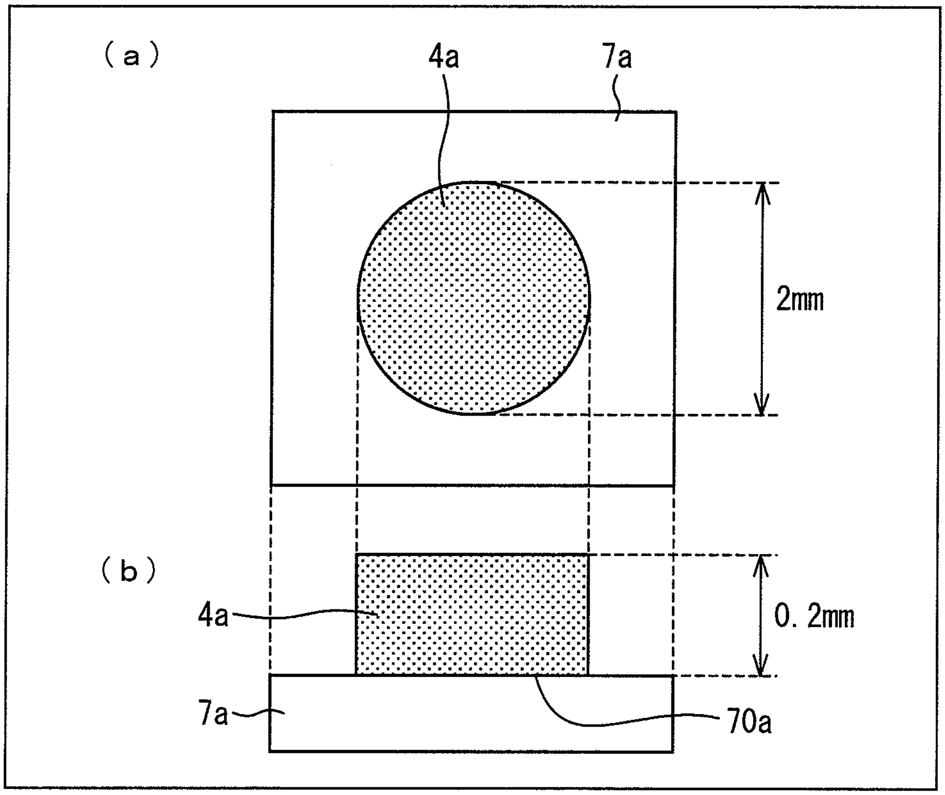

FIG. 5 is a view schematically illustrating a light emitting section and a heat sink in accordance with an example of the present invention. (a) of FIG. 5 is a plan view thereof, and (b) of FIG. 5 is a side view thereof.

Figure 6:
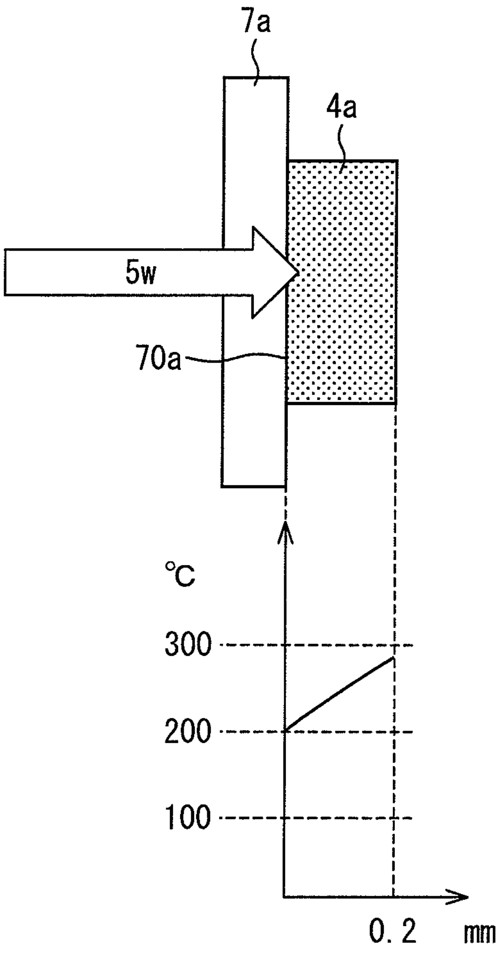

FIG. 6 is a view showing a temperature gradient of a light emitting section 4*a* along its thickness direction, which temperature gradient was observed when a laser beam having a light intensity of 5 W was emitted onto the light emitting section 4*a* (height: 0.2 mm) shown in FIG. 5.

Figure 7:
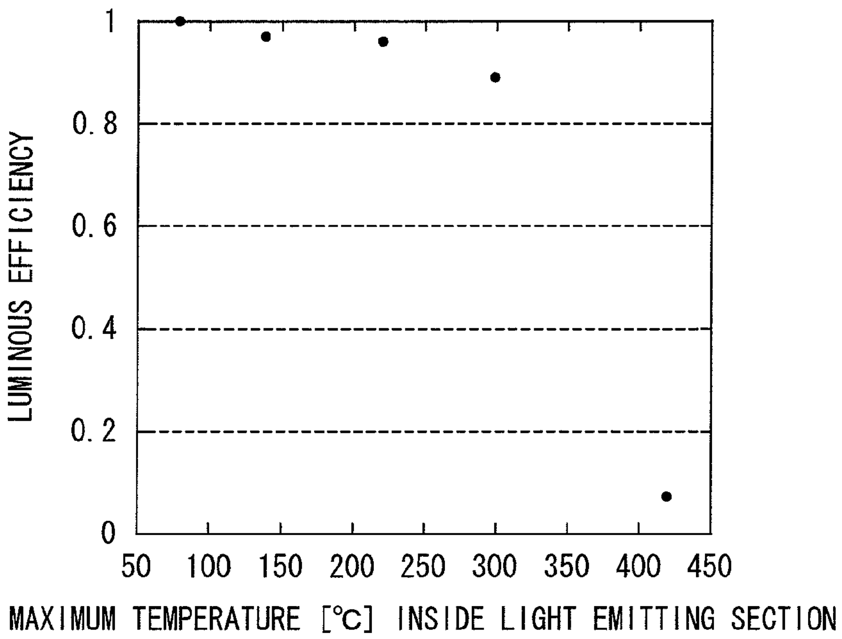

FIG. 7 is a view illustrating a relationship between (i) a maximum temperature inside a light emitting section and (ii) a luminous efficiency of the light emitting section which relationship was observed when a low-melting glass was used as a sealing material.

Figure 8:
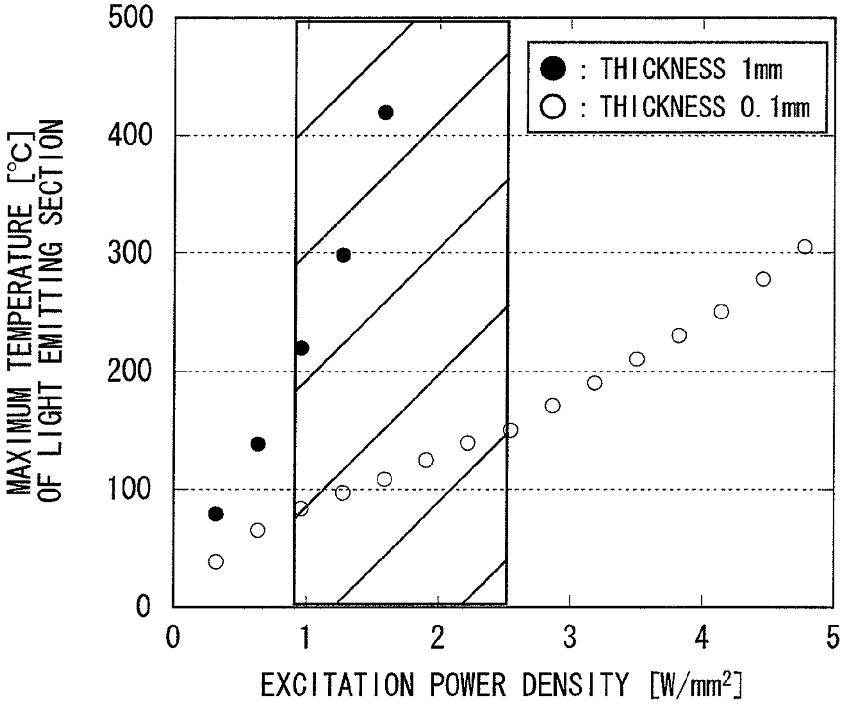

FIG. 8 is a view, related to light emitting sections having different thicknesses and different fluorescent material contents, illustrating a relationship between an excitation power density (W/mm$^2$) and a maximum temperature (° C.) of each light emitting section.

Figure 9:
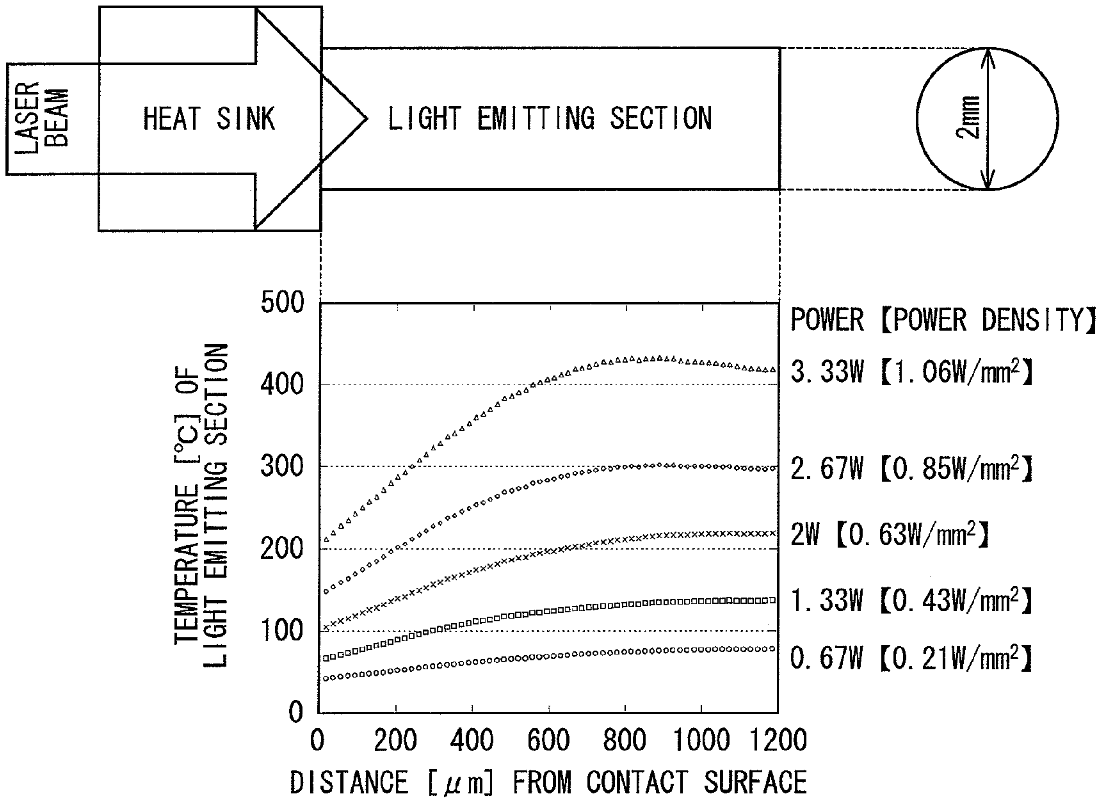

FIG. 9 is a view showing a relationship between (i) a distance (μm) between a contact surface of a heat sink and a light emitting section and (ii) a temperature (° C.) of the light emitting section, which relationship was observed with different excitation power densities (W/mm$^2$).

Figure 10:
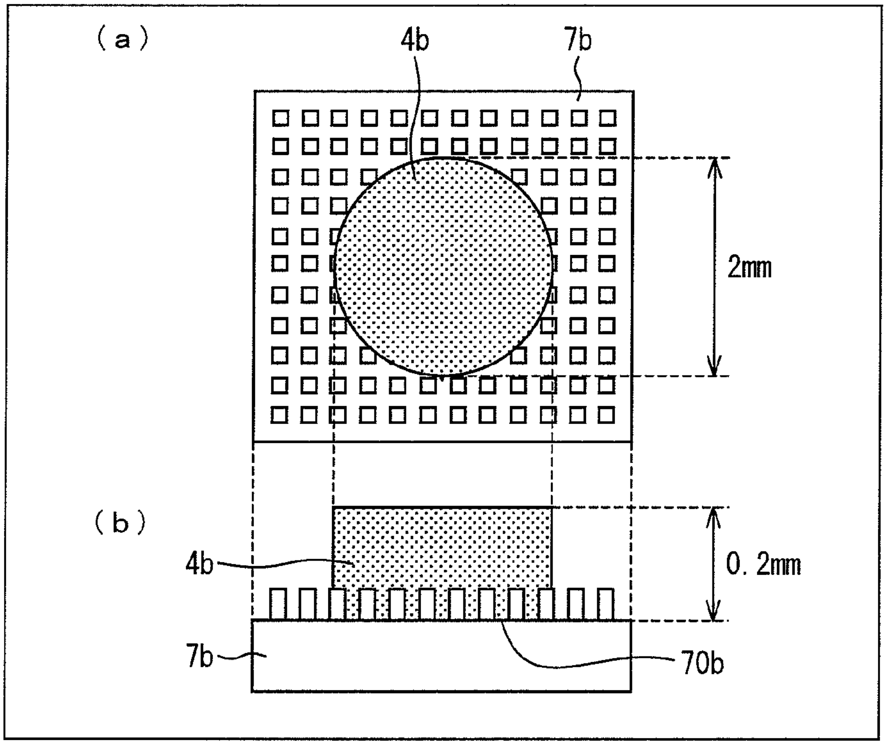

FIG. 10 is a view schematically illustrating a light emitting section and a heat sink in accordance with an example of the present invention. (a) of FIG. 10 is a plan view thereof, and (b) of FIG. 10 is a side view thereof.

Figure 11:
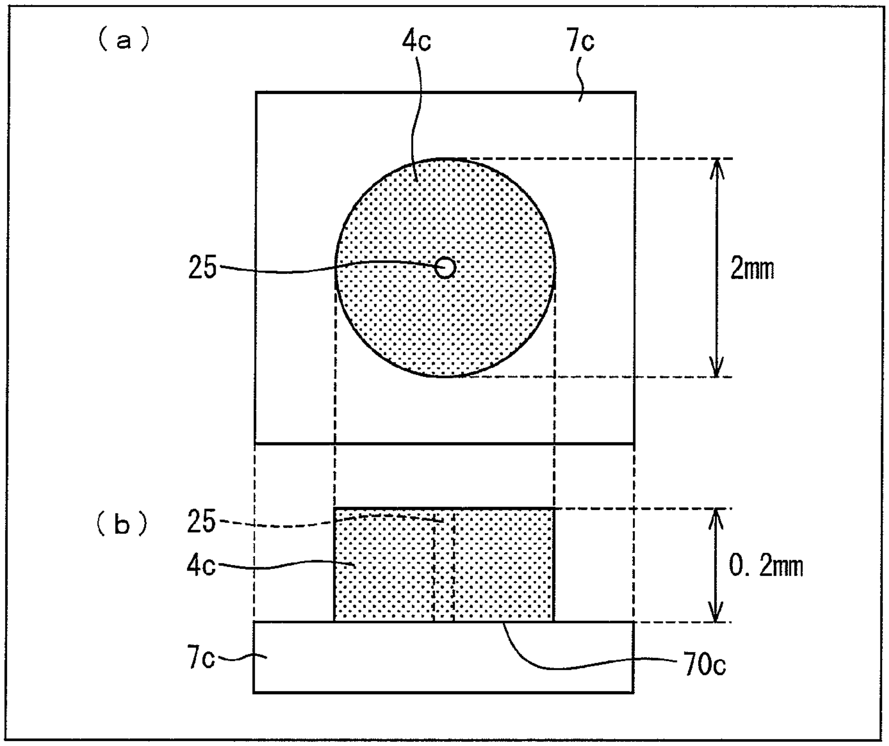

FIG. 11 is a view schematically illustrating a light emitting section and a heat sink in accordance with an example of the present invention. (a) of FIG. 11 is a plan view thereof, and (b) of FIG. 11 is a side view thereof.

Figure 12:
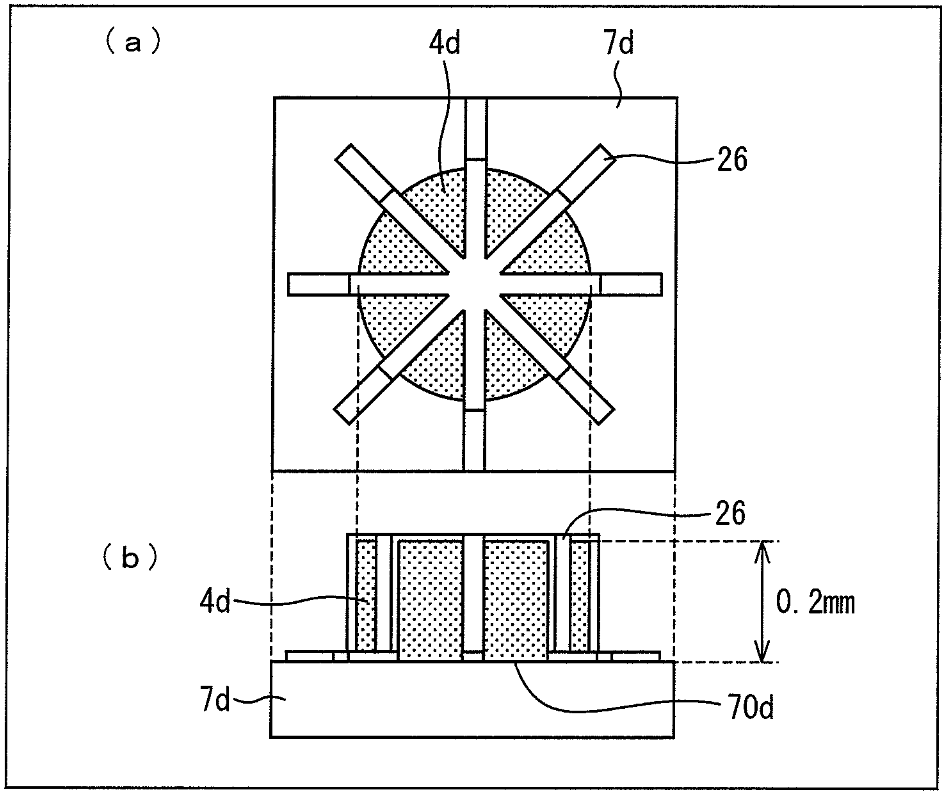

FIG. 12 is a view schematically illustrating a light emitting section and a heat sink in accordance with an example of the present invention. (a) of FIG. 12 is a plan view thereof, and (b) of FIG. 12 is a side view thereof.

Figure 13:
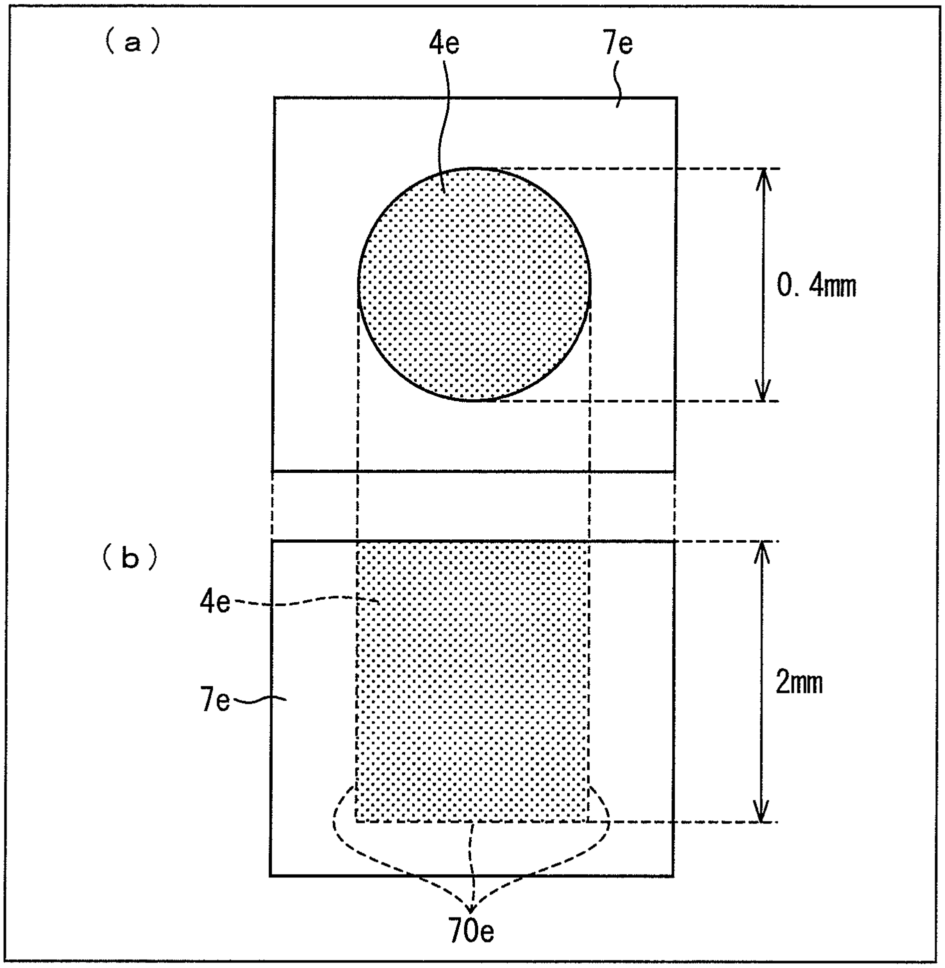

FIG. 13 is a view schematically illustrating a light emitting section and a heat sink in accordance with an example of the present invention. (a) of FIG. 13 is a plan view thereof, and (b) of FIG. 13 is a side view thereof.

Figure 14:
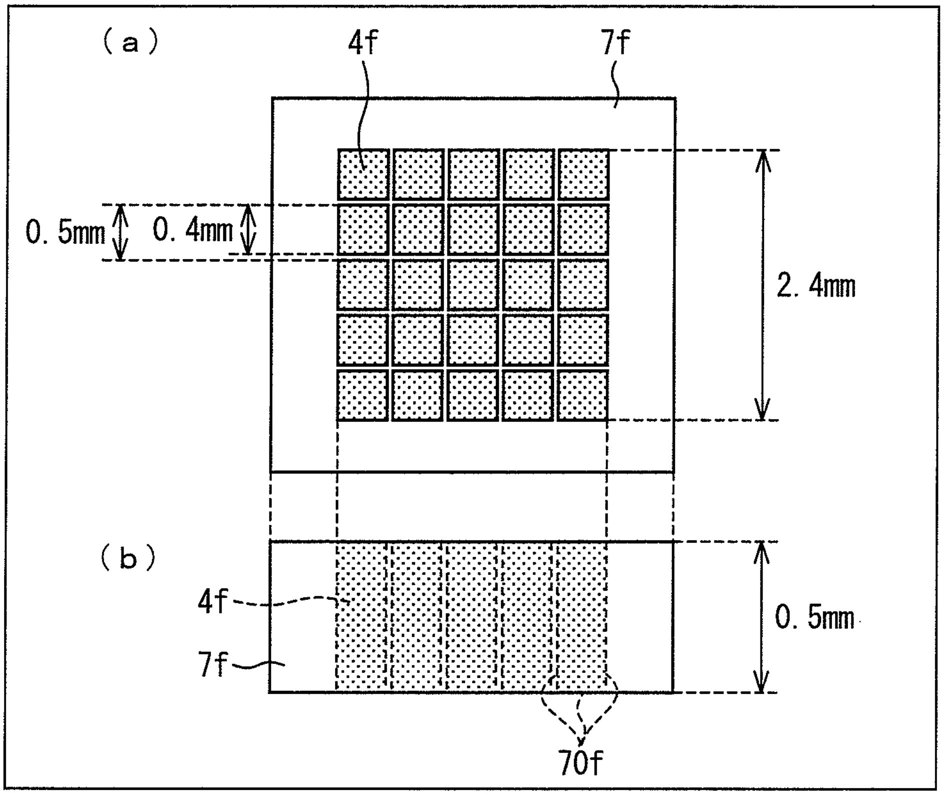

FIG. 14 is a view schematically illustrating light emitting sections and a heat sink in accordance with an example of the present invention. (a) of FIG. 14 is a plan view thereof, and (b) of FIG. 14 is a side view thereof.

Figure 15:
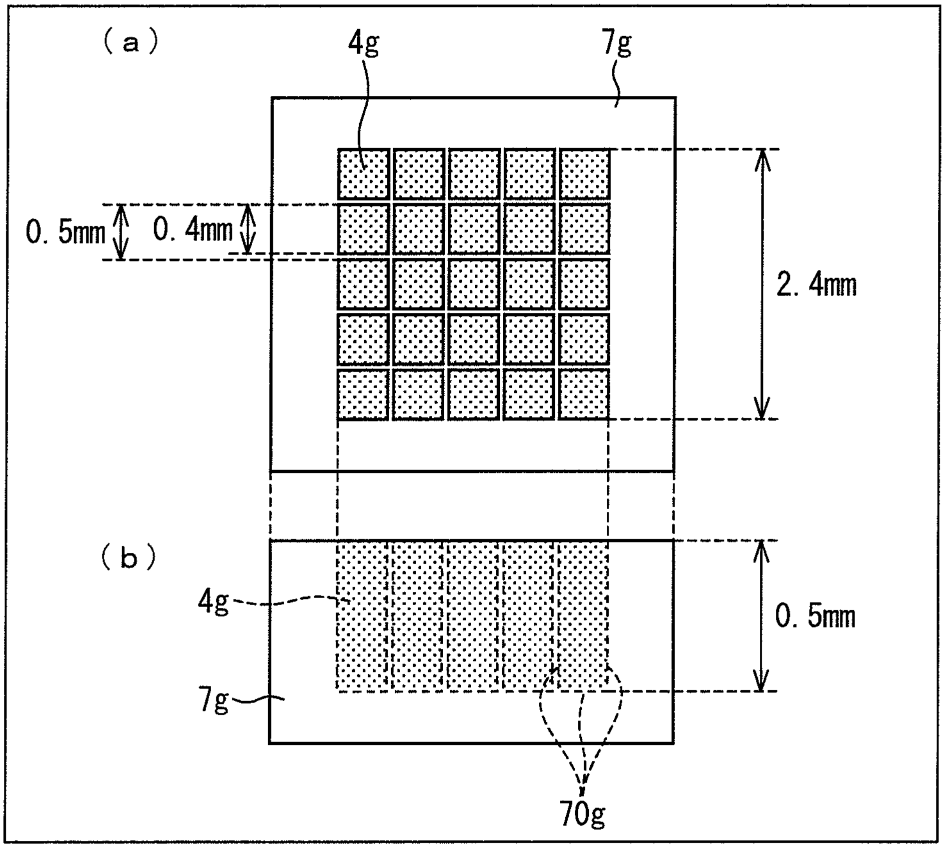

FIG. 15 is a view schematically illustrating light emitting sections and a heat sink in accordance with an example of the present invention. (a) of FIG. 15 is a plan view thereof, and (b) of FIG. 15 is a side view thereof.

Figure 16:
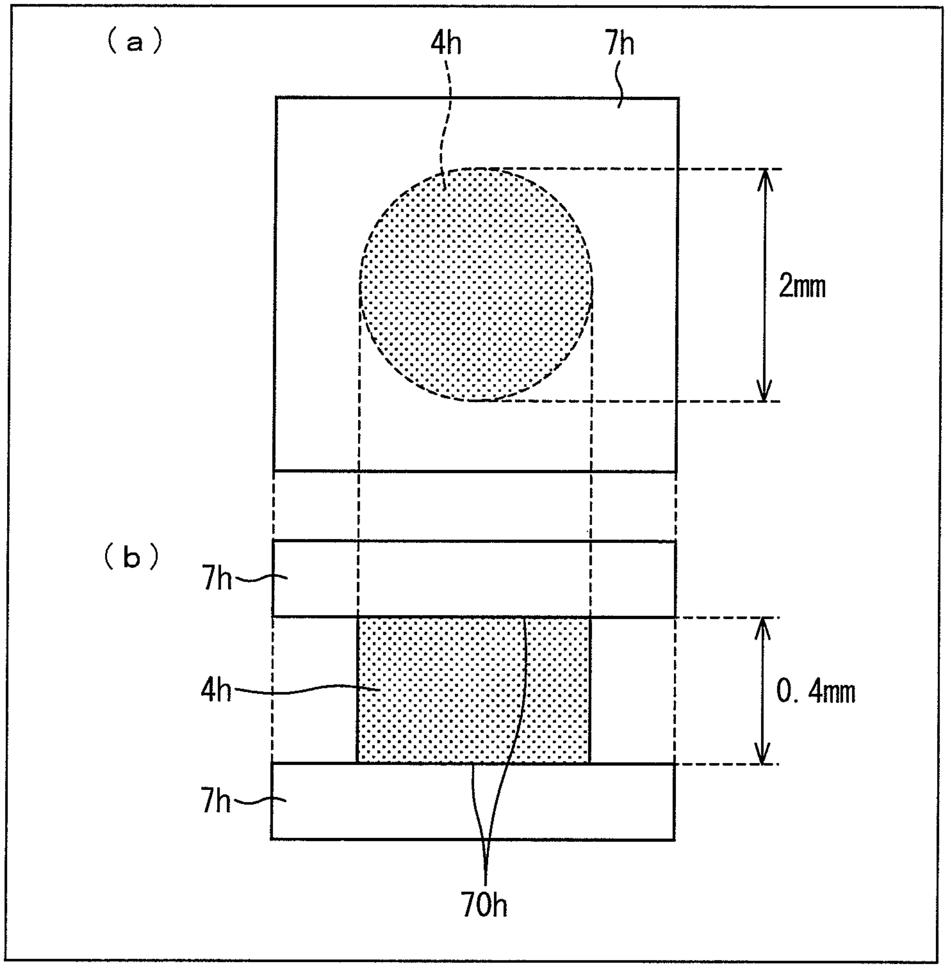

FIG. 16 is a view schematically illustrating a light emitting section and heat sinks in accordance with an example of the present invention. (a) of FIG. 16 is a plan view thereof, and (b) of FIG. 16 is a side view thereof.

Figure 17:
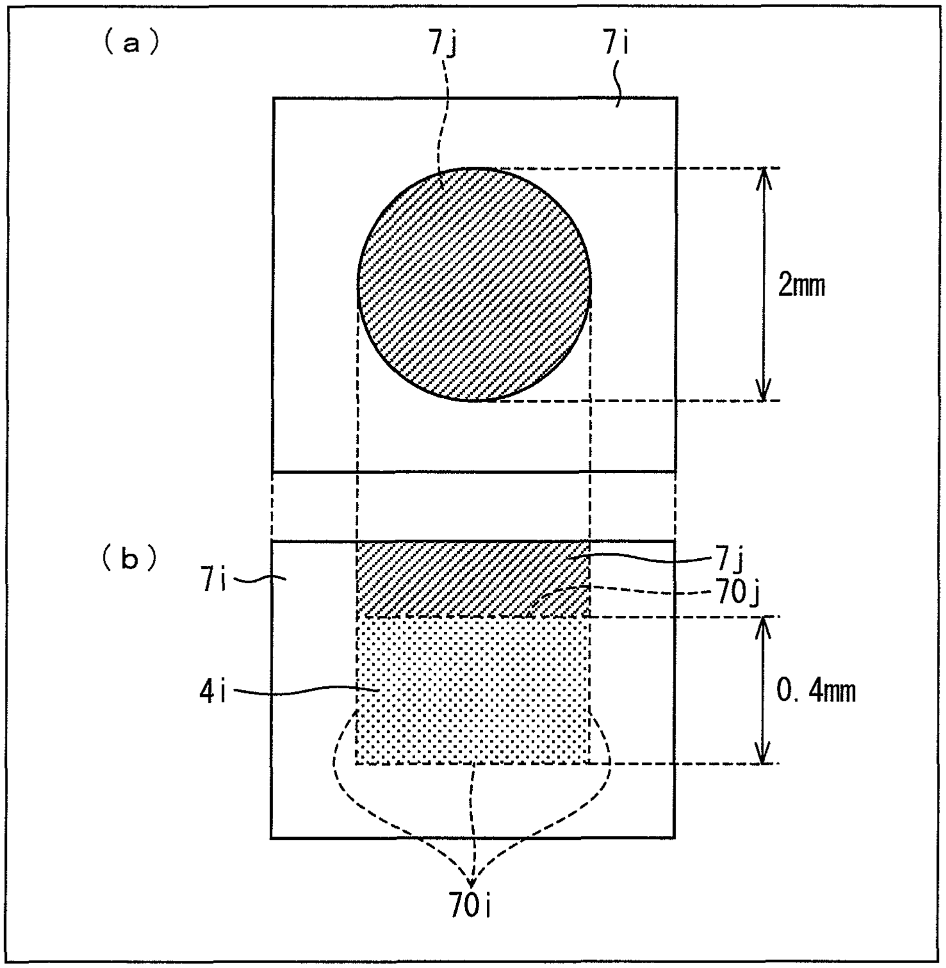

FIG. 17 is a view schematically illustrating a light emitting section and heat sinks in accordance with an example of the present invention. (a) of FIG. 17 is a plan view thereof, and (b) of FIG. 17 is a side view thereof.

DESCRIPTION OF EMBODIMENTS

The following will describe a headlamp 1, etc. in accordance with an embodiment of the present invention with reference to drawings. The following description mainly deals with the headlamp. However, needless to say, the headlamp is one example of an illumination device to which the present invention is applied, and the present invention is applicable to any illumination devices. In the following description, the same parts and the same constituent elements are given the same signs. The parts and constituent elements given the same signs have the same names and the same functions. Therefore, detailed descriptions of such the parts and constituent elements will not be repeated.

Figure 1:
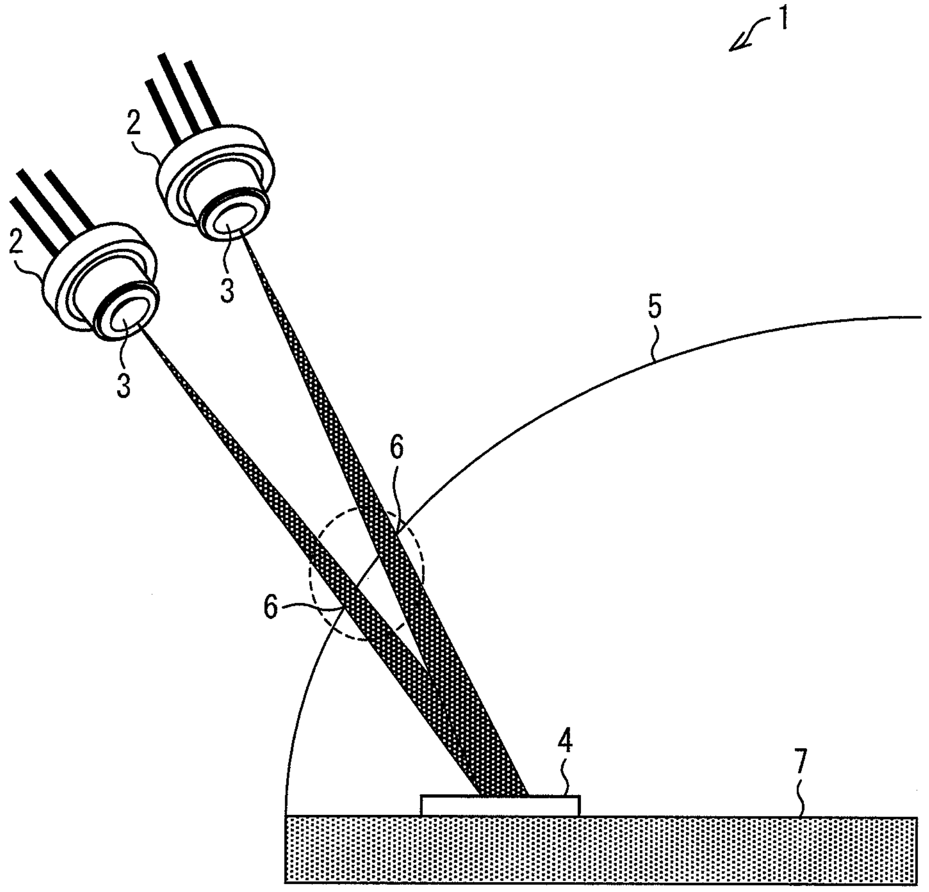
FIG. 1 is a cross-section view schematically illustrating a configuration of a headlamp in accordance with an embodiment of the present invention.

The following will describe an embodiment of the present invention with reference to FIG. 1, etc.

[Configuration of Headlamp 1]

FIG. 1 is a cross-section view schematically illustrating a configuration of a headlamp (light emitting device) 1 in accordance with an embodiment of the present invention. As shown in FIG. 1, the headlamp 1 includes a laser element (excitation light source, semiconductor laser) 2, a lens 3, a light emitting section 4, a parabolic mirror (reflecting mirror) 5, and a heat sink (heat releasing section) 7.

(Laser Element 2)

The laser element 2 is a light emitting element functioning as an excitation light source for emitting excitation light. The number of laser elements 2 may be more than one. In the case where a plurality of laser elements 2 are provided, each of the laser elements 2 emits a laser beam serving as excitation light. Instead of the plurality of laser elements 2, only one laser element 2 may be provided. However, a high-power laser beam can be more easily attained with a plurality of laser elements 2 than with only one laser element 2.

The laser element 2 may be a single chip having a single light emitting point, or a single chip having a plurality of light emitting points. The laser element 2 emits a laser beam having a wavelength of, e.g., 405 nm (blue-violet) or 450 nm (blue). However, the wavelength of the laser beam is not limited to these, and can be determined appropriately in accordance with a type of a fluorescent material contained in the light emitting section 4.

Further, instead of the laser element, it is possible to use a light emitting diode (LED) as the excitation light source (light emitting element).

(Lens 3)

The lens 3 is a lens for adjusting (e.g., magnifying) an emission range of the laser beam in order that the laser beam from the laser element 2 is appropriately incident on the light emitting section 4. Such magnifying lenses 3 are provided for the respective laser elements 2.

(Light Emitting Section 4)

The light emitting section 4 emits fluorescence upon receiving the laser beam emitted from the laser element 2. The light emitting section 4 includes a fluorescent material for emitting light upon receiving the laser beam. Specifically, the light emitting section 4 is made of a sealing material in which the fluorescent material is dispersed. Alternatively, the light emitting section 4 can be the fluorescent material pressed into a solid. Because the light emitting section 4 converts a laser beam into fluorescence, the light emitting section 4 can be called a wavelength conversion element.

The light emitting section 4 is provided on the heat sink 7 and at a position including a focal point of the parabolic mirror 5 and the surrounding of the focal point. Accordingly, the fluorescence emitted from the light emitting section 4 is reflected by a reflecting curved surface of the parabolic mirror 5, so that an optical path of the fluorescence is controlled. A part of the light emitting section 4 which part corresponds to the focal point of the parabolic mirror 5 is excited most strongly, whereas a part of the light emitting section 4 which part corresponds to the surrounding of the focal point is excited at a degree corresponding to a light intensity distribution of a laser beam on an irradiated surface of the light emitting section 4, onto which irradiated surface the laser beam is emitted. The details thereof will be described later.

Examples of the fluorescent material of the light emitting section 4 encompass an oxynitride fluorescent material (e.g., a sialon fluorescent material) and a III-V compound semiconductor nanoparticle fluorescent material (e.g., indium phosphide: InP). These fluorescent materials are high in heat resistance against the high-power (and/or high-light density) laser beam emitted from the laser element 2, and therefore are suitably used in a laser illumination light source. Note, however, that the fluorescent material of the light emitting section 4 is not limited to those described above, and can be other fluorescent materials, such as a nitride fluorescent material.

Further, under the Japanese law, a color of illumination light of a headlamp is limited to white having chromaticity in a predetermined range. For this reason, the light emitting section 4 includes a fluorescent material(s) with which white illumination light is obtained.

For example, white light can be generated by emitting a laser beam of 405 nm onto a light emitting section 4 containing a blue fluorescent material, a green fluorescent material, and a red fluorescent material. Alternatively, white light can be generated by emitting a laser beam of 450 nm (blue) (or a so-called blue-like laser beam having a peak wavelength in a range of 440 nm or more but not more than 490 nm) onto a light emitting section 4 containing a yellow fluorescent material (or a green fluorescent material and a red fluorescent material).

Examples of the sealing material of the light emitting section 4 encompass a glass material, sapphire, zirconia, AlN and $TiO_2$. With an excitation power density of 0.65 $W/mm^2$ or more, an organic material might be deteriorated, and therefore an organic-inorganic hybrid glass and a resin material such as a silicone resin cannot be used. The glass material may be a low-melting glass. It is preferable that the sealing material has high transparency. In a case where a high-power laser beam is used, it is preferable that the sealing material has high heat resistance.

(Parabolic Mirror 5)

The parabolic mirror 5 reflects the fluorescence generated by the light emitting section 4 so as to form a pencil of beams (illumination light) that travels in a predetermined solid angle. The parabolic mirror 5 may be, e.g., (i) a member whose surface is coated with a metal thin film or (ii) a metallic member.

Figure 2:
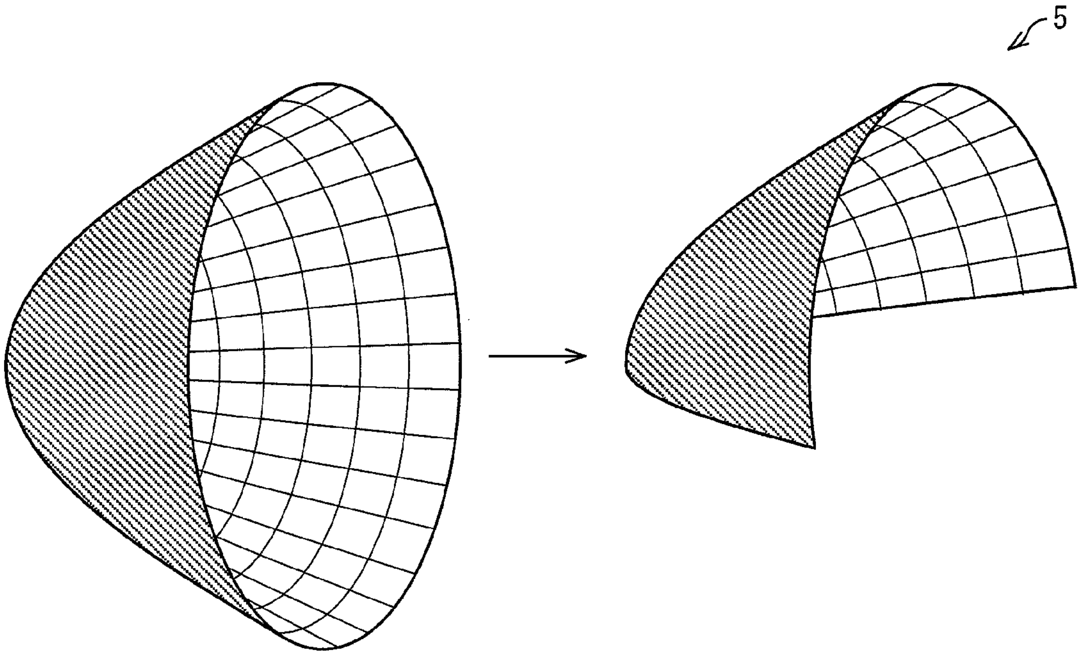
FIG. 2 is a view conceptually illustrating a paraboloid of revolution of a parabolic mirror.

FIG. 2 is a view conceptually illustrating a paraboloid of revolution of the parabolic mirror 5. (a) of FIG. 3 is a top view of the parabolic mirror 5. (b) of FIG. 3 is a front view of the parabolic mirror 5. (c) of FIG. 3 is a side view of the parabolic mirror 5. For simple explanation, each of (a) of FIG. 3 through (c) of FIG. 3 shows an example where the parabolic mirror 5 is formed by hollowing out an inside of a rectangular solid member.

As shown in FIG. 2, the parabolic mirror 5 includes, as its reflecting surface, at least a part of a partial curved surface obtained by (i) forming a curved surface (parabolic curved surface) by rotating a parabola around a rotational axis which is a symmetric axis of the parabola, and by (ii) cutting the curved surface along a plane including the rotational axis. The parabolic curved surface is shown as the curved line indicated by the sign 5*a* in each of (a) of FIG. 3 and (c) of FIG. 3. Further, as shown in (b) of FIG. 3, an opening section 5*b* (an exit through which illumination light exits) of the parabolic mirror 5 is shaped in a half circle when the parabolic mirror 5 is viewed from the front.

The laser element 2 is provided outside the parabolic mirror 5, and the parabolic mirror 5 is provided with a window section 6 through which the laser beam is transmitted or passed. The window section 6 can be an opening section or a section including a transparent member which can transmit a laser beam. For example, the window section 6 may be a transparent plate provided with a filter which transmits a laser beam but reflects white light (fluorescence generated by the light emitting section 4). With this configuration, it is possible to prevent the fluorescence generated by the light emitting section 4 from leaking from the window section 6.

The number of window sections 6 is not particularly limited. A single window section 6 can be shared by a plurality of laser elements 2. Alternatively, a plurality of window sections 6 can be provided for a plurality of laser elements 2, respectively.

Note that a part of the parabolic mirror 5 may not be a part of the parabola. Further, the reflecting mirror of the light emitting device of the present invention can be (i) a parabolic mirror having an opening section shaped in a closed ring or (ii) the one including a part of such a parabolic mirror. Furthermore, the reflecting mirror is not limited to the parabolic mirror, but may be a mirror having an elliptic surface or a mirror having a hemispheric surface. That is, the reflecting mirror can be any mirror provided that it includes, as its reflecting surface, at least a part of a curved surface formed by rotating a figure (ellipse, circle, parabola) around a rotational axis.

(Heat Sink 7)

The heat sink 7 releases, via a contact surface of the heat sink 7 which contact surface is in contact with the light emitting section 4, heat generated in the light emitting section 4 in response to the laser beam emitted onto the light emitting section 4. For this purpose, the heat sink 7 is often made from a metal material through which heat is easily conducted, e.g., aluminum or copper. However, the material of the heat sink 7 is not particularly limited, and only needs to have high heat conductivity.

Note, however, that a surface of the heat sink 7 which is in contact with the light emitting section 4 via the contact surface preferably functions as a reflecting surface. Configuring the surface of the heat sink 7 as the reflecting surface enables the followings: (i) After a laser beam entering the light emitting section 4 via its upper surface is converted into fluorescence, the fluorescence is reflected by the reflecting surface so as to be directed toward the parabolic mirror 5. (ii) A laser beam entering the light emitting section 4 via its upper surface is reflected by the reflecting surface and is directed to the inside of the light emitting section 4, so that the laser beam is converted into fluorescence. This makes it possible to increase the luminous efficiency of the headlamp 1.

Note that the heat sink 7 may be provided with a fan (not illustrated) or the like in order to forcibly increase an amount of moving air, thereby increasing the heat releasing efficiency. Alternatively, the heat sink 7 may employ a water-cooling system. Greater details of the heat sink 7 will be described later with reference to FIG. 5, etc., and therefore the detailed description of the heat sink 7 is omitted here.

The heat sink 7 is covered with the parabolic mirror 5. In other words, the heat sink 7 has a surface facing the reflecting curved surface (paraboloidal surface) of the parabolic mirror 5. Preferably, a surface of the heat sink 7 on which surface the light emitting section 4 is provided is substantially parallel with the rotational axis of the paraboloid of revolution of the parabolic mirror 5, and substantially includes the rotational axis.

A positional relationship between the heat sink 7 and the parabolic mirror 5 is not limited to the one shown in FIG. 1, and may be any of various positional relationships.

[Mounting of Headlamp 1]

FIG. 4 is a view conceptually illustrating an orientation of the headlamp 1 mounted as a headlamp of an automobile (vehicle) 10. As shown in FIG. 4, the headlamp 1 may be attached to a head of the automobile 10 so that the parabolic mirror 5 is positioned on a lower side in a vertical direction. By mounting the headlamp 1 in the automobile 10 in this manner, the automobile 10 emits bright light in its front direction and also emits light having moderate brightness in its forward-downward direction, thanks to the above-described light projection property of the parabolic mirror 5.

Note that the headlamp 1 can be employed as a driving headlamp (high-beam headlamp) of a vehicle or a passing headlamp (low-beam headlamp) of a vehicle. While the automobile 10 is driving, light intensity distribution of the laser beam incident on the irradiated surface of the light emitting section 4 can be adjusted according to the driving condition. This makes it possible to project light with a desired light projection pattern while the automobile 10 is driving, thereby improving user's convenience.

Application Examples of Present Invention

A light emitting device of the present invention is applicable not only to a vehicle headlamp but also to other illumination devices. For example, an illumination device of the present invention can be a downlight. The downlight is an illumination device attached to a ceiling of a structure such as a house or a vehicle. Instead, the illumination device of the present invention can be achieved as a headlamp for a moving object (e.g., a human, a ship, an airplane, a submersible, or a rocket) other than a vehicle. Further, the illumination device of the present invention can be achieved as a searchlight, a projector, or an interior illumination device (such as a stand light) other than the downlight.

EXAMPLES

The following description deals with concrete examples of the present invention with reference to FIG. 5, etc. Note that members which are identical with members described in the foregoing embodiment have the same signs as those of the members described in the foregoing embodiment, and explanations of these are omitted here for the sake of simple explanation. Further, materials, shapes, and various values described below are merely examples, and the present invention is not limited to these.

In examples described below, the same contents as those in the already-described embodiment will not be explained.

Example 1

FIG. 5 is a view conceptually illustrating a light emitting section 4*a* and a heat sink 7*a* in accordance with an example of the present invention. (a) of FIG. 5 is a plan view thereof, and (b) of FIG. 5 is a side view thereof.

The light emitting section 4*a* shown in (a) and (b) of FIG. 5 is made of a mixture of (i) a lead-containing glass which is used as a sealing material (binder) having a heat conductivity of 1 $Wm^{-1}K^{-1}$ or more and (ii) a fluorescent material. A content of the fluorescent material may be changed according to a target color temperature. In the present example, a SiAlON fluorescent material is mixed with the sealing material at a content of 5 vol %. However, the present invention is not limited to this. The light emitting section 4*a* is prepared by sintering at 550° C. the fluorescent material and the lead-containing glass filled in a mold. The light emitting section 4*a* thus prepared by sintering is attached to the heat sink 7*a*. The light emitting section 4*a* is shaped in a circular cylinder having a diameter of 2 mm and a height of 0.2 mm. However, the height of the light emitting section 4*a* is not particularly limited, as long as the diameter of the light emitting section 4*a* is 0.2 mm or less.

The heat sink 7*a* is made from $Al_2O_3$ having a heat conductivity of 20 $Wm^{-1}K^{-1}$ or more. The heat sink 7*a* releases, via its contact surface 70*a* which is in contact with the light emitting section 4*a*, heat generated in the light emitting section 4*a* in response to the laser beam incident on the light emitting section 4*a*. The light emitting section 4*a* is provided on an upper surface of the heat sink 7*a*, and the height of the light emitting section 4*a* is 0.2 mm. Therefore, the light emitting section 4*a* is provided in a range of 0.2 mm from the contact surface 70*a* ((b) of FIG. 5). An effect given by setting a relative positional relationship between the light emitting section 4*a* and the heat sink 7*a* in this manner will be described with reference to FIG. 6.

FIG. 6 is a view showing a temperature gradient of the light emitting section 4*a* along its thickness direction, which temperature gradient was observed when a laser beam having a light intensity of 5 W was emitted onto the light emitting section 4*a* (height: 0.2 mm) shown in FIG. 5. Note that the laser beam was emitted from a side on which the heat sink 7*a* is provided, and then was transmitted through the heat sink 7*a*, so as to excite the light emitting section 4*a*.

As shown in FIG. 6, releasing, by the heat sink 7*a*, the heat generated in the light emitting section 4*a* results in occurrence of a temperature gradient along the thickness direction of the light emitting section 4*a* (i.e., a direction in which the laser beam is emitted). In this process, a surface of the light emitting section 4*a* which surface faces the contact surface 70*a* has a maximum temperature. However, the maximum temperature was approximately 280° C., which is below a melting point (approximately 400° C.) of the lead-containing glass binding the particles of the fluorescent material contained in the light emitting section 4*a*. Thus, the light emitting section 4*a* can prevent (i) a reduction in the luminous efficiency which reduction is caused by melting of the binder and (ii) a reduction in the luminous efficiency which reduction is caused by an increase in the temperature of the light emitting section 4*a*. Consequently, the light emitting section 4*a* can attain desired luminous efficiency. Namely, since the light emitting section 4*a* is provided in the range of 0.2 mm from the contact surface 70*a*, the light emitting section 4*a* can attain desired luminous efficiency.

In the present example, the laser beam is emitted from the side on which the heat sink 7*a* is provided, and then transmits through the heat sink 7*a*, so as to excite the light emitting section 4*a*. Therefore, the heat sink 7*a* may be made from a material which becomes transparent in a visible light range, e.g., AlN or $TiO_2$. Alternatively, the heat sink 7*a* needs not be made from the material which becomes transparent in the visible light range, provided that the laser beam is emitted from a side on which the light emitting section 4*a* is provided. In such a case, the heat sink 7*a* may be made from a metal material having high electric conductivity, e.g., Al, Au, Ag, or Cu.

[Sealing Material of Light Emitting Section 4]

Instead of the glass (heat conductivity: 1 $Wm^{-1}K^{-1}$), the sealing material of the light emitting section 4 may be AlN (heat conductivity: 250 $Wm^{-1}K^{-1}$), sapphire (heat conductivity: 27.21 $Wm^{-1}K^{-1}$), $TiO_2$ (heat conductivity: 11.7 $Wm^{-1}K^{-1}$), zirconia (heat conductivity: 22.7 $Wm^{-1}K^{-1}$), or the like. However, among the inorganic materials used as the sealing material of the light emitting section 4, the glass has the lowest heat conductivity, and therefore the glass has the most strict thickness condition for preventing heat generation. Therefore, conditions required in a case of using the glass as the sealing material cover conditions required in a case of using other inorganic material as the sealing material.

For example, assume that a low-melting glass is used as the sealing material. Then, when the temperature of the light emitting section 4 is in a range from 300° C. to 400° C., there occurs a phenomenon that the luminous efficiency of the light emitting section 4 is rapidly reduced. FIG. 7 is a view illustrating a relationship between (i) a maximum temperature inside the light emitting section 4 and (ii) a luminous efficiency of the light emitting section 4 which relationship was observed when a low-melting glass was used as the sealing material. As shown in FIG. 7, at the point when the maximum temperature inside the light emitting section 4 reaches the vicinity of the range from 300° C. to 400° C., the luminous efficiency is rapidly reduced. Considering this, the temperature of the light emitting section 4 is preferably 300° C. or lower. Note that the low-melting glass has a melting point which is lower than those of any other inorganic materials. Therefore, the result obtained when the low-melting glass is used as the sealing material satisfies the conditions required when other inorganic material is used as the sealing material. In cases where an inorganic material other than the low-melting glass is used as the sealing material, the phenomenon of the rapid reduction of the luminous efficiency of the light emitting section 4 would not be observed, provided that the temperature of the light emitting section 4 is close to 300° C.

[Relationship Between Thickness of Light Emitting Section 4, Fluorescent Material Content, and Excitation Power Density]

Next, with reference to FIG. 8, the following will describe a relationship between an excitation power density ($W/mm^2$) and a maximum temperature (° C.) of the light emitting section 4. FIG. 8 is a view, related to light emitting sections 4 having different thicknesses and different fluorescent material contents, illustrating a relationship between an excitation power density ($W/mm^2$) and a maximum temperature (° C.) of each light emitting section 4. Here, glass was used as the sealing material. Further, in FIG. 8, the legend "thickness of 1 mm" indicates data obtained with a light emitting section 4 whose thickness along a direction in which a laser beam was emitted was 1 mm, and the legend "thickness of 0.1 mm" indicates data obtained with a light emitting section 4 whose thickness along the direction in which the laser beam was emitted was 0.1 mm. Note that both the light emitting section having the thickness of 1 mm and the light emitting section having the thickness of 0.1 mm did not transmit the laser beam, and the whole of the laser beam was incident on the light emitting section.

First, the data obtained with the light emitting section having the thickness of 1 mm is discussed. With the thickness of 1 mm, the light emitting section 4 had a fluorescent material content of 8 vol %. In this case, when the excitation power density became 1.2 W/mm$^2$ or more, the maximum temperature of the light emitting section 4 exceeded 300° C. Next, the data obtained with the light emitting section having the thickness of 0.1 mm is discussed. With the thickness of 0.1 mm, the light emitting section 4 had a fluorescent material content of 80 vol %. In this case, when the excitation power density was 4.5 W/mm$^2$ or less, the maximum temperature of the light emitting section 4 was 300° C. or lower. The results in FIG. 8 show that setting the thickness of the light emitting section so as to be within a range from 1 mm to 0.1 mm allows the light emitting section to have a maximum temperature of 300° C. or lower in a power density range from 0.94 W/mm$^2$ to 2.5 W/mm$^2$ (shaded region in FIG. 8), which power density range is used by the headlamp.

Further, the following will describe, with reference to FIG. 9, changes in the temperature of the light emitting section 4 which changes were observed with different excitation power densities (W/mm$^2$). FIG. 9 is a view showing a relationship between (i) a distance (μm) between the contact surface of the heat sink 7 and the light emitting section 4 and (ii) the temperature (° C.) of the light emitting section 4, which relationship was observed with different excitation power densities (W/mm$^2$).

As shown in FIG. 9, the higher the excitation power density is, the higher the temperature of the light emitting section 4 becomes. Now, focus on the data obtained with the highest excitation power density (1.06 W/mm$^2$) in FIG. 9. In a configuration in which the distance between the heat sink 7 and the light emitting section 4 was 300 μm, the temperature of the light emitting section 4 was in a range from 300° C. to 400° C., in which the luminous efficiency of the light emitting section 4 is reduced. On the other hand, in a configuration in which the distance between the heat sink 7 and the light emitting section 4 was 200 μm, the temperature of the light emitting section 4 was below 300° C. Thus, this configuration can prevent a reduction in the luminous efficiency of the light emitting section 4.

As explained with reference to FIGS. 8 and 9, the maximum temperature of the light emitting section 4 changes depending on various factors such as the thickness of the light emitting section 4, the fluorescent material content, and the excitation power density. However, as shown in FIG. 9, by setting the distance between the heat sink 7 (more specifically, the contact surface) and the light emitting section 4 to be not longer than 200 μm, it is possible to prevent the temperature of the light emitting section 4 from exceeding 300° C., thereby making it possible to prevent a reduction in the luminous efficiency of the light emitting section 4.

Further, as the light emitting section 4 (or the fluorescent material) is positioned so as to be closer to the heat sink 7, the heat of the light emitting section 4 can be released to the heat sink 7 more effectively. Since the maximum distance between the light emitting section and the heat sink 7 is 200 μm, it is possible to effectively cool, with the heat sink 7, the heat generated in the light emitting section 4. This makes it possible to prevent a reduction in the luminous efficiency of the light emitting section 4 which reduction is caused by heat generation.

Among the laser beam incident on the light emitting section 4, energy which does not contribute to fluorescence generation of the fluorescent material is used to generate heat inside the fluorescent material. However, as described above, setting the distance between the heat sink 7 and the light emitting section 4 as above prevents a reduction in the luminous efficiency of the fluorescent material in the light emitting section 4. Therefore, it is possible to reduce an amount of energy contributing to heat generation of the fluorescent material.

Example 2

FIG. 10 is a view schematically illustrating a light emitting section **4*b* and a heat sink 7*b* in accordance with an example of the present invention. (a) of FIG. 10 is a plan view thereof, and (b) of FIG. 10** is a side view thereof.

The light emitting section **4*b* is shaped in a circular cylinder having a diameter of 2 mm and a height of 0.2 mm. The light emitting section 4*b* has a bottom surface which is in contact with a contact surface 70*b* of the heat sink 7*b* made from Al. Each of (i) the bottom surface of the light emitting section 4*b* and (ii) the contact surface 70*b* of the heat sink 7*b*** has a recess-and-protrusion pattern. The recess-and-protrusion pattern is configured such that (i) each protrusion part has a width of 0.05 mm and (ii) a pitch between adjacent ones of the protrusion parts is 0.1 mm.

To be more specific, the following will describe how the light emitting section **4*b* and the heat sink 7*b* are produced. First, a recess-and-protrusion resist pattern is formed on one side of an Al plate by photolithography, and then a recess-and-protrusion pattern is formed on the Al plate by etching. The present example uses reactive ion etching, which is one of dry etching techniques. Instead of the reactive ion etching, other etching technique can be used, e.g., wet etching. Next, a cylindrical mold having no bottom part is placed on the Al plate. Then, glass and a fluorescent material are filled in the mold and sintered. As a result, the light emitting section 4*b* and the heat sink 7*b* shown in (a) and (b) of FIG. 10** are obtained.

This provides the following effect. Due to the configuration in which the bottom surface of the light emitting section **4*b* and the contact surface 70*b* of the heat sink 7*b* are in contact with each other via their recess- and protrusion patterns, an area of contact between the light emitting section 4*b* and the heat sink 7*b* is larger than an area of contact between the light emitting section 4*a* and the heat sink 7*a* in FIG. 5. Consequently, heat generated in the light emitting section 4*b* is released to the heat sink 7*b* more easily. Further, suitably changing the width of each protrusion part and the pitch between adjacent ones of the protrusion parts in the recess-and-protrusion patterns makes it possible to further improve the heat releasing efficiency achieved by the heat sink 7*b***.

Example 3

FIG. 11 is a view schematically illustrating a light emitting section **4*c* and a heat sink 7*c* in accordance with an example of the present invention. (a) of FIG. 11 is a plan view thereof, and (b) of FIG. 11** is a side view thereof.

The light emitting section 4*c* is shaped in a circular cylinder having a diameter of 2 mm and a height of 0.2 mm. The light emitting section 4*c* includes, in its inside, a needle (heat conductive member) 25 which is provided so as to extend along a thickness direction (a vertical direction in (b) of FIG. 11) of the light emitting section 4*c* and which is made from a material having higher heat conductivity than that of a sealing material of the light emitting section 4*c*. In the present example, the needle 25 is made from Au and has a thickness of 0.2 mm. The needle 25 is provided so as to be in contact with a contact surface 70*c* of the heat sink 7*c*, in order to conduct heat of the needle 25 to the heat sink 7*c*.

This provides the following effect. Due to the configuration in which heat of the light emitting section 4*c* is released to the heat sink 7*c* via the needle 25, which has higher heat conductivity than that of the sealing material, the heat of the entire light emitting section 4*c* can be effectively released to the heat sink 7*c*. The heat releasing efficiency thus obtained is significantly higher than that of the light emitting section 4*a* shown in FIG. 5, which does not include the needle 25 in its inside. Furthermore, each of the light emitting section 4*c* and the heat sink 7*c* does not need the step for forming the resist pattern. Therefore, the light emitting section 4*c* and the heat sink 7*c* can be produced in an easier manner than that for the light emitting section 4*b* and the heat sink 7*b* shown in FIG. 10.

Note that the needle 25 preferably has higher heat conductivity than that of the sealing material of the light emitting section 4*c*, and can be made from Al, Cu, AlN, $TiO_2$, or the like. Further, in order to improve the luminous efficiency of the light emitting section 4*c*, the needle 25 is preferably made from a material which is transparent in a visible light region, e.g., AlN or $TiO_2$. Furthermore, because the needle 25 which is too thick may cause a reduction in the luminous efficiency of the light emitting section 4*c*, the needle 25 is preferably configured such that a percentage of (i) an area of the needle 25 appearing on a fluorescence emitting surface of the light emitting section 4*c* with respect to (ii) an area of the fluorescence emitting surface is 40% or less, the fluorescence emitting surface facing another surface of the light emitting section 4*c*, the another surface of the light emitting section 4*c* being in contact with the contact surface 70*c*, and the fluorescence being emitted from the light emitting section 4*c* via the fluorescence emitting surface. Moreover, the needle 25 preferably has a thickness of 10 μm or more in view of its strength.

Example 4

FIG. 12 is a view schematically illustrating a light emitting section 4*d* and a heat sink 7*d* in accordance with an example of the present invention. (a) of FIG. 12 is a plan view thereof, and (b) of FIG. 12 is a side view thereof.

The light emitting section 4*d* is shaped in a circular cylinder having a diameter of 2 mm and a height of 0.2 mm. The light emitting section 4*d* has an outer surface on which a wire (heat conductive member) 26 made from a material having higher heat conductivity than that of a sealing material of the light emitting section 4*d* is provided (or wound). In the present example, the wire 26 is made from Au, and has a thickness of 0.2 mm. The wire 26 is provided so as to be in contact with a contact surface 70*d* of the heat sink 7*d*, in order to conduct heat of the wire 26 to the heat sink 7*d*.

This provides the following effect. Due to the configuration in which heat of the light emitting section 4*d* is released to the heat sink 7*d* via the wire 26, which has higher heat conductivity than that of the sealing material, the heat of the entire light emitting section 4*d* can be effectively released to the heat sink 7*d*.

The heat releasing efficiency thus obtained is improved far greater than that of the light emitting section 4*a* shown in FIG. 5, which does not have the wire 26 provided on its surface. Furthermore, each of the light emitting section 4*d* and the heat sink 7*d* does not need the step for forming the resist pattern. Therefore, the light emitting section 4*d* and the heat sink 7*d* can be produced in an easier manner than that for the light emitting section 4*b* and the heat sink 7*b* shown in FIG. 10. In addition, although the light emitting section 4*c* shown in FIG. 11 includes the needle 25 in its inside, the light emitting section 4*d* has the wire 26 which is provided on its outer surface. Therefore, it is possible to suitably change the way in which the wire 26 is provided and the number of wires 26. Thus, unlike the light emitting section 4*c* including the needle 25, whose way of attachment and whose number are difficult to be changed, the light emitting section 4*d* can improve its heat releasing efficiency without any remarkable difficulty.

Note that the wire 26 preferably has higher heat conductivity than that of the sealing material of the light emitting section 4*d*, and can be made from Al, Cu, AlN, $TiO_2$, or the like. Further, in order to improve the luminous efficiency of the light emitting section 4*d*, the wire 26 is preferably made from a material which is transparent in a visible light region, e.g., AlN or $TiO_2$. Furthermore, because the wire 26 which is too thick may cause a reduction in the luminous efficiency of the light emitting section 4*d*, the wire 26 is preferably configured such that a percentage of (i) an area of the wire 26 appearing on a surface of the light emitting section 4*d* with respect to (ii) an area of the surface is 40% less, the surface not including a surface of the light emitting section 4*d* which surface is in contact with the contact surface 70*d*. Moreover, the wire 26 preferably has a thickness of 10 μm or more in view of its strength. In addition, the wire 26 shown in FIG. 10 has both ends extending to the heat sink 7*d*. Alternatively, the wire 26 may be configured so as to have at least one end extending to the heat sink 7*d*.

Example 5

FIG. 13 is a view schematically illustrating a light emitting section 4*e* and a heat sink 7*e* in accordance with an example of the present invention. (a) of FIG. 13 is a plan view thereof, and (b) of FIG. 13 is a side view thereof.

The light emitting section 4*e* is shaped in a circular cylinder having a diameter of 0.4 mm and a height of 2 mm. The light emitting section 4*e* is provided on the heat sink 7*e* so that a bottom surface and a side surface of the light emitting section 4*e* are in contact with contact surfaces 70*e* of the heat sink 7*e* which is made from AlN. In other words, a circular cylindrical part of the heat sink 7*e* is hollowed out. Further, the light emitting section 4*e* is provided in the hollowed part, i.e., a recess. An upper surface (i.e., a surface facing the bottom surface which is in contact with the heat sink 7*e*) of the light emitting section 4*e* and an upper surface of the heat sink 7*e* are in a single plane.

With the above configuration, heat generated in the light emitting section 4*e* in response to a laser beam emitted onto the light emitting section 4*e* is released to the heat sink 7*e* via the contact surfaces 70*e*, which are in contact with the light emitting section 4*e*. Here, since the light emitting section 4*e* has a radius of 0.2 mm, the light emitting section 4*e* is within a range of 0.2 mm from each of the contact surfaces 70*e* (see (b) of FIG. 13). This allows the heat of the entire light emitting section 4*e* to be efficiently released to the heat sink 7*e*. Namely, regardless of the height of the light emitting section 4*e*, the heat of the entire light emitting section 4*e* can be efficiently released to the heat sink 7*e*.

As long as the light emitting section 4*e* is manufactured (designed) so that the light emitting section 4*e* is within the range of 0.2 mm from each of the contact surfaces 70*e*, the light emitting section 4*e* can be formed in any of various shapes. This improves flexibility in production and designing of the light emitting section 4*e*.

Example 6

FIG. 14 is a view schematically illustrating light emitting sections 4*f* and a heat sink 7*f* in accordance with an example of the present invention. (a) of FIG. 14 is a plan view thereof, and (b) of FIG. 14 is a side view thereof.

As shown in (a) of FIG. 14, the heat sink 7*f* made from AlN has, in a 2.4 mm (horizontal width)×2.4 mm (vertical width) region, a plurality of through-holes (in the present example, 25 through-holes). These through-holes are positioned at intervals of 0.5-mm pitch, and each of the through-holes has a size of 0.4 mm (horizontal width)×0.4 mm (vertical width)×0.5 mm (height). These through-holes are provided so that the light emitting sections 4*f* are provided therein. The plurality of through-holes penetrate through the heat sink 7*f*, and the light emitting sections 4*f* are provided in the plurality of through-holes. Namely, the light emitting sections 4*f* are in contact with contact surfaces 70*f* of the heat sink 7*f* through the respective through-holes.

Now, the following will describe how the light emitting sections 4*f* and the heat sink 7*f* are produced. First, a resist pattern for forming the through-holes in an AlN plate is formed by photolithography, and then the plurality of through-holes are formed in the AlN plate by etching. The present example uses reactive ion etching, which is one of dry etching techniques. Instead of the reactive ion etching, other etching technique can be used, e.g., wet etching. Next, glass and a fluorescent material are filled in the through-holes and sintered. As a result, the light emitting section 4*f* and the heat sink 7*f* shown in (a) and (b) of FIG. 14 are obtained.

This provides the following effect. In the present example, the light emitting sections 4*f* are provided in the through-holes. The heat sink 7*f* releases, via the contact surfaces 70*f*, heat generated in the light emitting section 4*f*, and a total area of the contact surfaces is configured to be a larger than those of the above-described examples. Further, since the plurality of through-holes are provided in the heat sink 7*f* in a lattice pattern, the area of the contact surfaces is further increased.

This allows the heat generated in the light emitting section 4*f* to be more efficiently released to the heat sink 7*f* via side surfaces of the plurality of through-holes, which are formed in the heat sink 7*f* in the lattice pattern. Furthermore, suitably changing the size of each through-hole, the pitch between the through-holes, etc. makes it possible to further improve the heat releasing efficiency achieved by the heat sink 7*f*.

Note that, in the 2.4 mm (horizontal width)×2.4 mm (vertical width) region of the heat sink 7*f* shown in (a) of FIG. 14, a total area of the plurality of through-holes is preferably larger than a total area of a region by which the plurality of through-holes are separated from each other. Particularly, a percentage of (i) the total area of the plurality of through-holes with respect to (ii) the total area of the above region of the heat sink 7*f* is preferably 60% or more. This makes it possible to prevent a reduction in an amount of light emitted from the light emitting section 4*f*, while effectively releasing, via the contact surfaces 70*f*, the heat generated in the light emitting section 4*f*. The region of the heat sink 7*f* in which region the through-holes are provided has been explained as having the size of 2.4 mm (horizontal width)×2.4 mm (vertical width). However, the size of this region is not limited to this.

Example 7

FIG. 15 is a view schematically illustrating light emitting sections 4*g* and a heat sink 7*g* in accordance with an example of the present invention. (a) of FIG. 15 is a plan view thereof, and (b) of FIG. 15 is a side view thereof.

As shown in (a) of FIG. 15, the heat sink 7*g* made from AlN has, in a 2.4 mm (horizontal width)×2.4 mm (vertical width) region, a plurality of recesses (in the present example, 25 recesses). These recesses are positioned at intervals of 0.5-mm pitch, and each of the recesses has a size of 0.4 mm (horizontal width)×0.4 mm (vertical width)×0.5 mm (height). These recesses are provided so that the light emitting sections 4*g* are provided therein. In the present example, the plurality of recesses do not penetrate through the heat sink 7*g*, but are formed so as to have respective bottom surfaces. In terms of this point, the present example is different from Example 6, in which the plurality of through-holes penetrate through the heat sink 7*f*.

This provides the following effect. In the present example, the light emitting sections 4*g* are provided in the recesses. The heat sink 7*g* releases, via contact surfaces 70*g*, heat generated in the light emitting section 4*g*, and a total area of the contact surfaces is configured to be larger than those of Example 1, etc. Further, since the plurality of recesses are provided in the heat sink 7*g* in a lattice pattern, the area of the contact surfaces can be further increased.

This allows the heat generated in the light emitting section 4*g* to be more efficiently released to the heat sink 7*g* via side surfaces of the plurality of recesses formed in the heat sink 7*g* in the lattice pattern. Furthermore, suitably changing the size of each recess, the pitch between the recesses, etc. makes it possible to further improve the heat releasing efficiency achieved by the heat sink 7*g*.

Note that, in a surface of the heat sink 7*g* (i.e., a surface of the heat sink 7*g* shown in (a) of FIG. 15), a total area of the plurality of recesses is preferably larger than a total area of a region by which the plurality of recesses are separated from each other. This makes it possible to prevent a reduction in an amount of light emitted from the light emitting section 4*g*, while effectively releasing, via the contact surfaces 70*g*, the heat generated in the light emitting section 4*g*.

Example 8

FIG. 16 is a view schematically illustrating a light emitting section 4*h* and heat sinks 7*h* in accordance with an example of the present invention. (a) of FIG. 16 is a plan view thereof, and (b) of FIG. 16 is a side view thereof.

The light emitting section 4*h* is shaped in a circular cylinder having a diameter of 2 mm and a height of 0.4 mm. The light emitting section 4*h* is sandwiched by the two heat sinks 7*h* via upper and lower surfaces of the light emitting section 4*h*. Of the two heat sinks 7*h*, one heat sink 7*h* provided so as to be closer to an irradiated surface of the light emitting section 4*h*, onto which irradiated surface a laser beam is emitted, is made from Al. On the other hand, the other heat sink 7*h*, which faces the one heat sink 7*h*, is made from $TiO_2$. Namely, the heat sink 7*h* being closer to a fluorescence emitting surface of the light emitting section 4*h* is preferably made from a transparent material such as $TiO_2$ so as not to hinder emission of the fluorescence. Whereas, the heat sink 7*h* being closer to the irradiated surface, onto which the laser beam is emitted, is preferably made from a high reflectance material, e.g., Al, Au, Ag, or Cu, each having a reflectance of 0.6 or more, so as to reflect the fluorescence toward the fluorescence emitting surface.

This configuration makes it possible to efficiently release heat of the light emitting section 4*h* to the heat sinks 7*h*, whose contact surfaces 70*h* are in contact with the light emitting section 4*h* via the upper and lower surfaces of the light emitting section 4*h*, respectively. Further, since the light emitting section 4*h* has a height of 0.4 mm, the light emitting section 4*h* is within a range of 0.2 mm from each of the contact surfaces 70*h*. This makes it possible to efficiently release the heat of the light emitting section 4*h* to the two heat sinks 7*h*.

Example 9

FIG. 17 is a view schematically illustrating a light emitting section 4*i*, a heat sink 7*i*, and a heat sink 7*j* in accordance with an example of the present invention. (a) of FIG. 17 is a plan view thereof, and (b) of FIG. 17 is a side view thereof.

The light emitting section 4*i* is shaped in a circular cylinder having a diameter of 2 mm and a height of 0.4 mm. The light emitting section 4*i* is in contact with the heat sink 7*i* made from Al, via a contact surface 70*i* corresponding to (i) a bottom surface (i.e., a lower surface in (b) of FIG. 17) and (ii) a side surface of the light emitting section 4*i*. Further, the light emitting section 4*i* is in contact with the heat sink 7*j* made from $TiO_2$, via a contact surface 70*j* corresponding to an upper surface of the light emitting section 4*i* which upper surface faces the bottom surface. In other words, the light emitting section 4*i* is provided in a recess of the heat sink 7*i*, and the heat sink 7*j* is provided on the upper surface of the light emitting section 4*i* as if the heat sink 7*j* serves as a lid of the recess. Namely, the light emitting section 4*i* is provided in a space created by the heat sink 7*i* and the heat sink 7*j*.

This configuration allows all surfaces of the light emitting section 4*i* to be in contact with the heat sink 7*i* and the heat sink 7*j* via the contact surfaces 70*i* and 70*j*, thereby making it possible to efficiently release heat of the entire light emitting section 4*h* to the heat sink 7*i* and the heat sink 7*j*.

A part of the heat sink 7*i* which part faces, of the surfaces of the light emitting section 4*i*, an irradiated surface of the light emitting section 4*i* onto which irradiated surface a laser beam is emitted is preferably made from a high reflectance material, e.g., Al, Au, Ag, or Cu, each having a reflectance of 0.5 or more, so as to reflect the fluorescence toward a fluorescence emitting surface. The heat sink 7*j* is preferably made from a transparent material such as $TiO_2$ so as not to hinder emission of the fluorescence.

The foregoing has explained the plural examples with reference to FIG. 5, etc. Note that the scope of the present invention encompasses (i) cases where the above-described examples are individually conducted and (ii) cases where plural ones of the above-described examples are conducted in combination. Note also that the above examples are explained for understanding of the present invention, and examples not described herein are also encompassed in the scope of the present invention.

Effects Achieved by Embodiments of the Present Invention

The following will describe effects achieved by embodiments of the present invention.

The headlamp 1 includes: the laser element 2 for emitting a laser beam; the light emitting section 4, including a sealing material made from an inorganic material, for emitting fluorescence upon receiving the laser beam emitted from the laser element 2; and the heat sink 7 for releasing, via the contact surface 70 of the heat sink 7 which contact surface 70 is in contact with the light emitting section 4, heat generated in the light emitting section 4 in response to the laser beam emitted onto the light emitting section 4, the light emitting section 4 existing within a range which is determined on the basis of the contact surface 70 and with which desired heat releasing efficiency is obtained.

According to the above configuration, the heat sink 7 releases, via the contact surface 70 which is in contact with the light emitting section 4, the heat generated in the light emitting section 4 in response to the laser beam emitted onto the light emitting section 4. Further, the light emitting section 4 exists within the range which is determined on the basis of the contact surface 70 and with which desired heat releasing efficiency is obtained. In other words, by causing the light emitting section 4 to exist within the range which is determined on the basis of the contact surface 70 and with which desired heat releasing efficiency is obtained, it is possible to allow the heat sink 7 to efficiently release, via the contact surface 70, the heat generated in the light emitting section 4.

With this, the headlamp 1 can solve the previously-described conventional problems. Specifically, the headlamp 1 does not need to move the light emitting section 4 so as to shift a position of the light emitting section 4 which position is irradiated with the laser beam, for the purpose of preventing an increase in a temperature of the light emitting section 4. Namely, the headlamp 1 can prevent an increase in the temperature of the light emitting section 4 without use of a driving section for shifting the position of the light emitting section 4 which position is irradiated with the laser beam. This makes it possible to reduce electric power consumption of the headlamp 1 as compared with the conventional light emitting device, thereby reducing economical burden on a user of the headlamp 1.

In addition, the headlamp 1 does not need the driving section, a control section for driving the driving section, or the like. Therefore, with a simple configuration, the headlamp 1 can prevent an increase in the temperature of the light emitting section 4, and accordingly can prevent a reduction in the luminous efficiency which reduction is caused by the increase in the temperature of the light emitting section 4. Therefore, the headlamp 1 can provide a user and a supplier of the headlamp 1 with a lot of merits such as a simple device layout, weight reduction, a reduction in design cost and manufacturing cost, and economical price.

As described above, being configured as above, the headlamp 1 can prevent, with a simple configuration, an increase in the temperature of the light emitting section 4, and can solve the conventional problems.

Further, the automobile 10 of the present invention includes the vehicle headlamp, the vehicle headlamp including: the laser element 2 for emitting a laser beam; the light emitting section 4, including a sealing material made from an inorganic material, for emitting fluorescence upon receiving the laser beam emitted from the laser element 2; the parabolic mirror 5 having a reflecting curved surface for reflecting the fluorescence emitted from the light emitting section 4; and the heat sink 7 for releasing, via the contact surface 70 of the heat sink 7 which contact surface 70 is in contact with the light emitting section 4, heat generated in the light emitting section 4 in response to the laser beam emitted onto the light emitting section 4, the light emitting section 4 existing within a range which is determined on the basis of the contact surface 70 and with which desired heat releasing efficiency is obtained, and the vehicle headlamp being mounted in the automobile 10 so that the reflecting curved surface is located on a lower side in a vertical direction.

According to the above configuration, the automobile 10 can prevent, with a simple configuration, an increase in the temperature of the light emitting section 4. Further, according to the above configuration, it is possible to provide a vehicle capable of solving the conventional problems.

Further, the headlamp 1 is preferably configured such that the light emitting section 4 and the heat sink 7 are provided so that a distance between (i) a given position in the light emitting section 4 and (ii) the contact surface 70 is 0.2 mm or less.

The conventional light emitting device moves the light emitting section 4 so as to shift a position of the light emitting section 4 which position is irradiated with the laser beam, for the purpose of preventing an increase in the temperature of the light emitting section 4. However, to the present inventors' knowledge, there is no publicly-known literature disclosing a technical idea of preventing, based on the distance between the light emitting section 4 and the heat sink 7, an increase in the temperature of the light emitting section 4.

Meanwhile, the present inventors found that providing the light emitting section 4 and the heat sink 7 so that the distance between (i) a given position in the light emitting section 4 and (ii) the contact surface 70 is 0.2 mm or less can prevent an increase in the temperature of the light emitting section 4. Namely, the present inventors found that defining a positional relationship between the light emitting section 4 and the heat sink 7 as such allows the heat generated in the light emitting section 4 to be efficiently released via the contact surface 70. With this configuration, the headlamp 1 can prevent an increase in the temperature of the light emitting section 4, and accordingly can prevent a reduction in the luminous efficiency which reduction is caused by the increase in the temperature of the light emitting section 4.

Further, the headlamp 1 is preferably configured such that the contact surface 70 has recesses and protrusions.

The shape having the recesses and protrusions has a surface area larger than that of a flat shape. Therefore, with the contact surface 70*b* having the recesses and protrusions, the light emitting section 4*b* and the heat sink 7*b* are in contact with each other in a larger area. This allows the light emitting section 4*b* to release a greater amount of heat. Consequently, the headlamp 1 can more efficiently release, via the contact surface 70*b*, heat generated in the light emitting section 4*b*.

Further, the headlamp 1 is preferably configured such that the light emitting section 4*c* includes, in its inside, the needle 25 capable of conducting heat to the heat sink 7*c*.

According to the above configuration, it is possible to conduct heat inside the light emitting section 4*c* to the needle 25, and to conduct the heat of the needle 25 to the heat sink 7*c*. This allows the headlamp 1 to more efficiently release, to the heat sink 7*c* via the needle 25 provided inside the light emitting section 4*c*, heat generated in the light emitting section 4*c*.

Further, the headlamp 1 is preferably configured such that the light emitting section 4 has a surface on which the wire 26 is provided, at least one end of the wire 26 extending to the heat sink 7*d*.

According to the above configuration, heat of the light emitting section 4*d* is conducted to the wire 26 provided on the surface of the light emitting section 4*d*. Further, at least one end of the wire 26 extends to the heat sink 7*d*. This allows the headlamp 1 to more efficiently release, to the heat sink 7*d* via the wire 26 provided on the surface of the light emitting section 4*d*, heat generated in the light emitting section 4*d*.

Further, the headlamp 1 is preferably configured such that the heat sink 7*f* has a plurality of through-holes arranged in a lattice pattern, and the light emitting sections 4*f* are provided in the plurality of through-holes.

According to the above configuration, the light emitting sections 4*f* are provided in the through-holes. The heat sink 7*f* releases, via side surfaces (i.e., the contact surfaces 70*f*) of the through-holes via which the light emitting section 4*f* and the heat sink 7*f* are in contact with each other, heat generated in the light emitting section 4*f*. Namely, a total area of the contact surfaces 70*f* is configured to be larger. Furthermore, the plurality of through-holes are provided in the heat sink 7*f* in the lattice pattern. This further increases the total area of the contact surfaces 70*f*.

Consequently, the headlamp 1 can more efficiently release the heat generated in the light emitting section 4*f* to the heat sink 7*f* via the side surfaces of the plurality of through-holes formed in the heat sink 7*f* in the lattice pattern.

Further, the headlamp 1 is preferably configured such that the heat sink 7*g* has a plurality of recesses arranged in a lattice pattern, and the light emitting sections 4*g* are provided in the plurality of recesses.

According to the above configuration, the light emitting sections 4*g* are provided in the recesses. The heat sink 7*g* releases, via side surfaces (i.e., the contact surfaces 70*g*) of the recesses via which the light emitting section 4*g* and the heat sink 7*g* are in contact with each other, heat generated in the light emitting section 4*g*. Namely, the contact surfaces 70*g* are configured to have a larger area. Furthermore, the plurality of recesses are provided in the heat sink 7*g* in the lattice pattern. This makes it possible to further increase a total area of the contact surfaces.

Consequently, the headlamp 1 can more efficiently release the heat generated in the light emitting section 4*g* to the heat sink 7*g* via the side surfaces of the plurality of recesses formed in the heat sink 7*g* in the lattice pattern.

Further, the headlamp 1 is preferably configured such that the contact surface 70*e* or the like is in contact with a plurality of surfaces of the light emitting section 4*e* or the like.

According to the above configuration, heat is released from the light emitting section 4*e* or the like to the heat sink 7*e* or the like via the plurality of surfaces of the light emitting section 4*e* or the like. Consequently, as compared with the headlamp 1 releasing heat via a single surface of the light emitting section 4*e* or the like, the headlamp 1 configured as above can more efficiently release, to the heat sink 7*e* or the like, heat generated in the light emitting section 4*e* or the like.

Further, the headlamp 1 is preferably configured such that the contact surface 70*h* is in contact with an irradiated surface of the light emitting section 4*h* onto which irradiated surface the laser beam is emitted, and at least a part of the heat sink 7*h* is made from a high reflectance material which reflects the fluorescence emitted from the light emitting section 4*h*, the part of the heat sink 7*h* being the contact surface.

The laser beam emitted onto the irradiated surface of the light emitting section 4*h* collides with a fluorescent material included in the light emitting section 4*h*, when passing through the light emitting section 4*h*. Then, the fluorescent material emits fluorescence in various directions. Here, a part of the fluorescence may travel toward the irradiated surface. In such a case, if at least a part of the heat sink 7*h*, i.e., at least the contact surface 70*h* is made from the high reflectance material which reflects the fluorescence emitted from the light emitting section 4*h*, the contact surface 70*h* can reflect the fluorescence traveling toward the irradiated surface, so that the fluorescence is emitted from a surface of the light emitting section 4*h* which surface is not a surface being in contact with the contact surface 70*h*. This makes it possible to further improve the luminous efficiency of the light emitting section 4*h*.

Further, the headlamp 1 is preferably configured such that the heat sink 7*h* has a transparent material which is in contact with the light emitting section 4*h*, and the fluorescence is emitted from the light emitting section 4*h* via the transparent material.

According to the above configuration, the headlamp 1 allows the fluorescence to be emitted from the light emitting section 4*h* via the transparent material. Therefore, as compared with other light emitting devices not having the transparent material, the headlamp 1 configured as above can further improve the luminous efficiency of the light emitting section 4*h*.

Further, the headlamp 1 is preferably configured such that a percentage of (i) an area of the needle 25 appearing on a fluorescence emitting surface of the light emitting section 4*c* with respect to (ii) an area of the fluorescence emitting surface is 40% or less, the fluorescence emitting surface facing another surface of the light emitting section 4*c*, the another surface of the light emitting section 4*c* being in contact with the contact surface 70*c*, and the fluorescence being emitted from the light emitting section via the fluorescence emitting surface.

There assumed a case where the needle 25 provided inside the light emitting section 4*c* appears on the fluorescence emitting surface of the light emitting section 4*c*, the fluorescence emitting surface facing the another surface of the light emitting section 4*c*, the another surface being in contact with the contact surface 70*c*, and the fluorescence being emitted via the fluorescence emitting surface. In this case, if the percentage of (i) the area of the needle 25 appearing on the fluorescence emitting surface with respect to (ii) the area of the fluorescence emitting surface is high, a region of the fluorescence emitting surface via which region the fluorescence can be emitted is small. This causes a reduction in the luminous efficiency of the light emitting section 4*c*.

In view of this, the percentage of (i) the area of the needle 25 appearing on the fluorescence emitting surface with respect to (ii) the area of the fluorescence emitting surface is set to 40% or less. This makes it possible to prevent a reduction in an amount of light obtained from the light emitting section 4*c*, while efficiently releasing, via the contact surface 70*c*, heat generated in the light emitting section 4*c*.

Further, the headlamp 1 is preferably configured such that a percentage of (i) an area of the wire 26 appearing on the surface of the light emitting section 4*d* with respect to (ii) an area of the surface of the light emitting section 4*d* is 40% or less, the surface not including a surface of the light emitting section 4*d* which surface is in contact with the contact surface 70*d*.

In a case where the wire 26, at least one end of which extends to the heat sink 7, is provided on the surface of the light emitting section 4*d*, a region of the fluorescence emitting surface via which region the fluorescence can be emitted is made smaller. This causes a reduction in the luminous efficiency of the light emitting section 4*d*.

In view of this, the wire 26 is configured such that the percentage of (i) the area of the wire 26 appearing on the surface of the light emitting section 4*d* with respect to (ii) the area of the surface of the light emitting section 4*d* is 40% or less, the surface not including the surface of the light emitting section 4*d* which surface is in contact with the contact surface 70*d*. This makes it possible to prevent a reduction in an amount of light obtained from the light emitting section 4*d*, while efficiently releasing, via the contact surface 70*d*, heat generated in the light emitting section 4*d*.

Further, the headlamp 1 is preferably configured such that the needle 25 (or the wire 26) has higher heat conductivity than that of the sealing material which is included in the light emitting section 4*c* (or the light emitting section 4*d*) in order to seal a fluorescent material.

Configuring the needle 25 (or the wire 26) so as to have higher heat conductivity than that of the sealing material which is included in the light emitting section 4*c* (or the light emitting section 4*d*) in order to seal the fluorescent material allows heat of the light emitting section 4*c* (or the light emitting section 4*d*) to be conducted to the needle 25 (or the wire 26) more easily. The heat of the needle 25 (or the wire 26) is then conducted to the heat sink 7. Thus, the heat generated in the light emitting section 4*c* (or the light emitting section 4*d*) can be efficiently released via the contact surface 70*c* (or 70*d*).

Further, the headlamp 1 is preferably configured such that the needle 25 (or the wire 26) is made from a transparent material.

According to the above configuration, for example, even in a case (i) where the needle 25 appears on the fluorescence emitting surface via which the fluorescence is emitted or (ii) where the wire 26 is provided on the surface of the light emitting section 4*d*, the fluorescence emitted from the light emitting section 4 passes through the needle 25 (or the wire 26), and therefore the region of the fluorescence emitting surface via which region the fluorescence is emitted is not reduced in area. Thus, as compared with a configuration in which the needle 25 (or the wire 26) is made from a material which does not transmit light, the headlamp 1 configured as above can improve efficiency of obtaining light from the light emitting section 4*c* (or the light emitting section 4*d*).

Further, the headlamp 1 is preferably configured such that, in a surface of the heat sink 7, a total area of the plurality of through-holes is 1.5 times or more larger than a total area of a region by which the plurality of through-holes are separated from each other.

As the area of the region by which the plurality of through-holes are separated from each other increases, a region of the fluorescence emitting surface via which region the fluorescence from the light emitting section 4*f* can be emitted becomes smaller. This causes a reduction in an amount of light emitted from the headlamp 1.

In view of this, in the surface of the heat sink 7*f*, the total area of the plurality of through-holes is set to be 1.5 times or more larger than the total area of the region by which the plurality of through-holes are separated from each other. This makes it possible to prevent a reduction in an amount of light emitted from the headlamp 1, while efficiently releasing, via the contact surfaces 70*f*, heat generated in the light emitting section 4*f*.

Further, the headlamp 1 is preferably configured such that, in a surface of the heat sink 7*g*, a total area of the plurality of recesses is 1.5 times or more larger than a total area of a region by which the plurality of recesses are separated from each other.

As the area of the region by which the plurality of recesses are separated from each other increases, a region of the fluorescence emitting surface via which region the fluorescence from the light emitting section 4*g* can be emitted becomes smaller. This causes a reduction in an amount of light emitted from the headlamp 1.

In view of this, in the surface of the heat sink 7*g*, the total area of the plurality of recesses is set to be 1.5 times or more larger than the total area of the region by which the plurality of recesses are separated from each other. This makes it possible to prevent a reduction in an amount of light emitted from the headlamp 1, while efficiently releasing, via the contact surface 70*g*, heat generated in the light emitting section 4*g*.

Further, the headlamp 1 is preferably configured such that a relative positional relationship between the light emitting section 4 and the heat sink 7 is set so that a temperature of the light emitting section is 300° C. or lower when the laser beam has an excitation density which is within a range from 0.94 $W/mm^2$ to 3.2 $W/mm^2$.

Generally, the light emitting device can be used for various purposes, e.g., for an automobile headlamp. For driver's and pedestrian's safety, the automobile headlamp is under a lot of regulations. In other words, the light emitting device satisfying the standards for the automobile headlamp can be suitably used also for other purposes. Namely, many light emitting devices are designed while taking into consideration the standards for the automobile headlamp.

In view of this, the present inventors conducted a study for applying the headlamp 1 to an automobile headlamp so as to provide an automobile headlamp having an aperture smaller than that of a conventional automobile headlamp. As a result, the present inventors found that, for this purpose, the fluorescence emitting surface of the light emitting section must have an area of 3.2 $mm^2$ or less and an excitation power of the laser beam must be set to be 3 W or more.

According to this, a lower limit of an excitation density of the laser beam is set to 0.94 $W/mm^2$ (=3 W/3.2 $mm^2$), and an upper limit of the excitation density of the laser beam is set to 3.2 $W/mm^2$, at which the light emitting section 4 can be maintained at a temperature of 300° C. or lower. This makes it possible to provide an automobile headlamp having an aperture smaller than that of a conventional automobile headlamp and being capable of outputting light equivalent to that outputted by the conventional automobile headlamp.

Thus, by configuring the headlamp 1 as above, it is possible to provide a next-generation automobile headlamp having an aperture smaller than that of a conventional automobile headlamp and being capable of outputting light equivalent to that outputted by the conventional automobile headlamp.

Further, the present invention encompasses a vehicle headlamp including the headlamp 1.

Further, the present invention encompasses an illumination device including the headlamp 1.

The headlamp 1 is suitably applicable to a vehicle headlamp, an illumination device, or the like. For example, assume that the headlamp 1 is applied to the vehicle headlamp. Then, it is possible to provide a vehicle headlamp capable of (i) preventing, with a simple configuration, an increase in a temperature of the light emitting section 4 and (ii) solving the previously-described conventional problems.

[Others]

A light emitting device of the present invention may be configured to include (i) a heat sink made from a material having a heat conductivity of 20 $Wm^{-1}K^{-1}$ or more and (ii) a light emitting section made of a sealing material having a heat conductivity of 1 $Wm^{-1}K^{-1}$ or more and a fluorescent material, the light emitting section being attached to the heat sink, and the light emitting section existing only in a region which is far from the heat sink by 0.2 mm or less.

A surface of the heat sink and a surface of the light emitting section via which surfaces the heat sink and the light emitting section are in contact with each other may have recesses and protrusions.

The light emitting section may include a needle in its inside, and the needle may have higher heat conductivity than that of the sealing material.

The needle may have a cross-section area which is 0.4 times or less larger than an area of an upper surface of the light emitting section.

The needle may be made from a transparent material.

A wire may be provided on the light emitting section, and the wire may have higher heat conductivity than that of the sealing material.

A percentage of (i) an area of the wire appearing on a surface of the light emitting section with respect to (ii) an area of the surface of the light emitting section may be 40% or less.

The wire may be made from a transparent material.

The light emitting section may have bottom and side surfaces to each of which a heat sink is attached.

The heat sink may have two or more filling holes in which the light emitting sections are filled.

A percentage of (i) an area of the filling holes appearing on a region of the heat sink in which region the filling holes are provided with respect to (ii) an area of the region of the heat sink may be 60% or more.

The light emitting section may have bottom and top surfaces to each of which a heat sink is attached.

A heat sink attached to one of the bottom and top surfaces of the light emitting section may be made from a transparent material.

A heat sink attached to one of the bottom and top surfaces of the light emitting section may be made from a material having a reflectance of 0.5 or more.

The light emitting section may be covered with a heat sink.

A part of the heat sink may be made from a transparent material.

A part of the heat sink may be made from a material having a reflectance of 0.5 or more.

The heat sink may be made from a material such as $Al_2O_3$, $TiO_2$, or AlN.

The sealing material may be made from a material such as $Al_2O_3$, $TiO_2$, AlN, a lead-containing glass, or glass.

When excitation light has an excitation density which is in a range from 0.94 $W/mm^2$ to 3.1 $W/mm^2$, a temperature of the light emitting section including a fluorescent material is 300° C. or lower.

The light emitting section is made of a sealing material which is made from an inorganic material, and the light emitting section is provided within a range of 0.2 mm from the heat sink.

Further, the light emitting device of the present invention is preferably configured such that the light emitting section and the heat releasing section are provided so that a distance between (i) a given position in the light emitting section and (ii) the contact surface is 0.2 mm or less.

The conventional light emitting device moves the light emitting section so as to shift a position of the light emitting section which position is irradiated with the excitation light, for the purpose of preventing an increase in a temperature of the light emitting section. However, to the present inventors' knowledge, there is no publicly-known literature disclosing a technical idea of preventing, based on the distance between the light emitting section and the heat releasing section, an increase in the temperature of the light emitting section.

Meanwhile, the present inventors found that providing the light emitting section and the heat releasing section so that the distance between (i) a given position in the light emitting section and (ii) the contact surface is 0.2 mm or less can prevent an increase in the temperature of the light emitting section. Namely, the present inventors found that defining a positional relationship between the light emitting section and the heat releasing section as such allows the heat generated in the light emitting section to be efficiently released via the contact surface. With this configuration, the light emitting device of the present invention can prevent an increase in the temperature of the light emitting section, and accordingly can prevent a reduction in the luminous efficiency which reduction is caused by the increase in the temperature of the light emitting section.

Further, the light emitting device of the present invention is preferably configured such that the contact surface has recesses and protrusions.

The shape having the recesses and protrusions has a surface area larger than that of a flat shape. Therefore, with the contact surface having the recesses and protrusions, the light emitting section and the heat releasing section are in contact with each other in a larger area. This allows the light emitting section to release a greater amount of heat. Consequently, the light emitting device of the present invention can more efficiently release, via the contact surface, the heat generated in the light emitting section.

Further, the light emitting device of the present invention is preferably configured such that the light emitting section includes, in its inside, a heat conductive member capable of conducting heat to the heat releasing section.

According to the above configuration, it is possible to conduct heat inside the light emitting section to the heat conductive member, and to conduct the heat of the heat conductive member to the heat releasing section. This allows the light emitting device of the present invention to more efficiently release, to the heat releasing section via the heat conductive member provided inside the light emitting section, the heat generated in the light emitting section.

Further, the light emitting device of the present invention is preferably configured such that the light emitting section has a surface on which a heat conductive member is provided, at least one end of the heat conductive member extending to the heat releasing section.

According to the above configuration, heat of the light emitting section is conducted to the heat conductive member provided on the surface of the light emitting section. Further, at least one end of the heat conductive member extends to the heat releasing section. This allows the light emitting device of the present invention to more efficiently release, to the heat releasing section via the heat conductive member provided on the surface of the light emitting section, the heat generated in the light emitting section.

Further, the light emitting device of the present invention is preferably configured such that the heat releasing section has a plurality of through-holes arranged in a lattice pattern; and the light emitting section comprises a plurality of light emitting sections, and the plurality of light emitting sections are provided in the plurality of through-holes.

According to the above configuration, the light emitting sections are provided in the through-holes. The heat releasing section releases, via side surfaces (i.e., the contact surface) of the through-holes via which the light emitting section and the heat releasing section are in contact with each other, heat generated in the light emitting section. Namely, the contact surface is configured to have a larger area. Furthermore, the plurality of through-holes are provided in the heat releasing section in the lattice pattern. This further increases the area of the contact surface.

Consequently, the light emitting device of the present invention 1 can more efficiently release the heat generated in the light emitting section to the heat releasing section via the side surfaces of the plurality of through-holes formed in heat releasing section in the lattice pattern.

Further, the light emitting device of the present invention is preferably configured such that the heat releasing section has a plurality of recesses arranged in a lattice pattern; and the light emitting section comprises a plurality of light emitting sections, and the plurality of light emitting sections are provided in the plurality of recesses.

According to the above configuration, the light emitting sections are provided in the recesses. The heat releasing section releases, via side surfaces (i.e., the contact surface) of the recesses via which the light emitting section and the heat releasing section are in contact with each other, heat generated in the light emitting section. Namely, the contact surface is configured to have a larger area. Furthermore, the plurality of recesses are provided in the heat releasing section in the lattice pattern. This makes it possible to further increase the area of the contact surface.

Consequently, the light emitting device of the present invention can more efficiently release the heat generated in the light emitting section to the heat releasing section via the side surfaces of the plurality of recesses formed in the heat releasing section in the lattice pattern.

Further, the light emitting device of the present invention is preferably configured such that the contact surface is in contact with a plurality of surfaces of the light emitting section.

According to the above configuration, heat is released from the light emitting section to the heat releasing section via the plurality of surfaces of the light emitting section. Consequently, as compared with a light emitting device releasing heat via a single surface of the light emitting section, the light emitting device of the present invention can more efficiently release, to the heat releasing section, heat generated in the light emitting section.

Further, the light emitting device of the present invention is preferably configured such that the contact surface is in contact with an irradiated surface of the light emitting section onto which irradiated surface the excitation light is emitted; and at least a part of the heat releasing section is made from a high reflectance material which reflects the fluorescence emitted from the light emitting section, said part of the heat releasing section being the contact surface.

The excitation light emitted onto the irradiated surface of the light emitting section collides with a fluorescent material included in the light emitting section, when passing through the light emitting section. Then, the fluorescent material emits fluorescence in various directions. Here, a part of the fluorescence may travel toward the irradiated surface. In such a case, if at least a part of the heat releasing section, i.e., at least the contact surface is made from the high reflectance material which reflects the fluorescence emitted from the light emitting section, the contact surface can reflect the fluorescence traveling toward the irradiated surface, so that the fluorescence is emitted from a surface of the light emitting section which surface is not a surface being in contact with the contact surface. This makes it possible to further improve the luminous efficiency of the light emitting section.

Further, the light emitting device of the present invention is preferably configured such that the heat releasing section has a light-transmitting section which is in contact with the light emitting section; and the fluorescence is emitted from the light emitting section via the light-transmitting section.

According to the above configuration, the light emitting device of the present invention allows the fluorescence to be emitted from the light emitting section via the light-transmitting section. Therefore, as compared with other light emitting devices not having the light-transmitting section, the light emitting device of the present invention can further improve the luminous efficiency of the light emitting section.

Further, the light emitting device of the present invention is preferably configured such that a percentage of (i) an area of the heat conductive member appearing on a fluorescence emitting surface of the light emitting section with respect to (ii) an area of the fluorescence emitting surface is 40% or less, the fluorescence emitting surface facing another surface of the light emitting section, the another surface of the light emitting section being in contact with the contact surface, and the fluorescence being emitted from the light emitting section via the fluorescence emitting surface.

There assumed a case where the heat conductive member provided inside the light emitting section appears on the fluorescence emitting surface of the light emitting section, the fluorescence emitting surface facing the another surface of the light emitting section, the another surface being in contact with the contact surface, and the fluorescence being emitted from the light emitting section via the fluorescence emitting surface. In this case, if the percentage of (i) the area of the heat conductive member appearing on the fluorescence emitting surface with respect to (ii) the area of the fluorescence emitting surface is high, a region of the fluorescence emitting surface via which region the fluorescence can be emitted is small. This causes a reduction in the luminous efficiency of the light emitting section.

In view of this, the percentage of (i) the area of the heat conductive member appearing on the fluorescence emitting surface with respect to (ii) the area of the fluorescence emitting surface is set to 40% or less. This makes it possible to prevent a reduction in an amount of light obtained from the light emitting section, while efficiently releasing, via the contact surface, heat generated in the light emitting section.

Further, the light emitting device of the present invention is preferably configured such that a percentage of (i) an area of the heat conductive member appearing on said surface of the light emitting section with respect to (ii) an area of said surface of the light emitting section is 40% or less, said surface not including a surface of the light emitting section which surface is in contact with the contact surface.

In a case where the heat conductive member, at least one end of which extends to the heat releasing section, is provided on the surface of the light emitting section, a region of the fluorescence emitting surface via which region the fluorescence can be emitted is made smaller. This causes a reduction in the luminous efficiency of the light emitting section.

In view of this, the heat conductive member is configured such that the percentage of (i) the area of the heat conductive member appearing on the surface of the light emitting section with respect to (ii) the area of the surface of the light emitting section is 40% or less, the surface not including the surface of the light emitting section which surface is in contact with the contact surface. This makes it possible to prevent a reduction in an amount of light obtained from the light emitting section, while efficiently releasing, via the contact surface, heat generated in the light emitting section.

Further, the light emitting device of the present invention is preferably configured such that the heat conductive member has higher heat conductivity than that of the sealing material which is included in the light emitting section in order to seal a fluorescent material.

Configuring the heat conductive member so as to have higher heat conductivity than that of the sealing material which is included in the light emitting section in order to seal the fluorescent material allows heat of the light emitting section to be conducted to the heat conductive member more easily. The heat of the heat conductive member is then conducted to the heat releasing section. Thus, the heat generated in the light emitting section can be efficiently released via the contact surface.

Further, the light emitting device of the present invention is preferably configured such that the heat conductive member is made from a transparent material.

According to the above configuration, for example, even in a case (i) where the heat conductive member appears on the fluorescence emitting surface via which the fluorescence is emitted or (ii) where the heat conductive member is provided on the surface of the light emitting section, the fluorescence emitted from the light emitting section passes through the heat conductive member, and therefore the region of the fluorescence emitting surface via which region the fluorescence is emitted is not reduced in area. Thus, as compared with a configuration in which the heat conductive member is made from a material which does not transmit light, the light emitting device of the present invention can improve efficiency of obtaining light from the light emitting section.

Further, the light emitting device of the present invention is preferably configured such that, in a surface of the heat releasing section, a total area of the plurality of through-holes is 1.5 times or more larger than a total area of a region by which the plurality of through-holes are separated from each other.

As the area of the region by which the plurality of through-holes are separated from each other increases, a region of the fluorescence emitting surface via which region the fluorescence from the light emitting section can be emitted becomes smaller. This causes a reduction in an amount of light emitted from the light emitting device.

In view of this, in the surface of the heat releasing section, the total area of the plurality of through-holes is set to be 1.5 times or more larger than the total area of the region by which the plurality of through-holes are separated from each other. This makes it possible to prevent a reduction in an amount of light emitted from the light emitting device, while efficiently releasing, via the contact surface, heat generated in the light emitting section.

Further, the light emitting device of the present invention is preferably configured such that, in a surface of the heat releasing section, a total area of the plurality of recesses is 1.5 times or more larger than a total area of a region by which the plurality of recesses are separated from each other.

As the area of the region by which the plurality of recesses are separated from each other increases, a region of the fluorescence emitting surface via which region the fluorescence from the light emitting section can be emitted becomes smaller. This causes a reduction in an amount of light emitted from the light emitting device.

In view of this, in the surface of the heat releasing section, the total area of the plurality of recesses is set to be 1.5 times or more larger than the total area of the region by which the plurality of recesses are separated from each other. This makes it possible to prevent a reduction in an amount of light emitted from the light emitting device, while efficiently releasing, via the contact surface, heat generated in the light emitting section.

Further, the light emitting device of the present invention is preferably configured such that a relative positional relationship between the light emitting section and the heat releasing section is set so that a temperature of the light emitting section is 300° C. or lower when the excitation light has an excitation density which is within a range from 0.94 $W/mm^2$ to 3.2 $W/mm^2$.

Generally, the light emitting device can be used for various purposes, e.g., for an automobile headlamp. For driver's and pedestrian's safety, the automobile headlamp is under a lot of regulations. In other words, the light emitting device satisfying the standards for the automobile headlamp can be suitably used also for other purposes. Namely, many light emitting devices are designed while taking into consideration the standards for the automobile headlamp.

In view of this, the present inventors conducted a study for applying the light emitting device of the present invention to an automobile headlamp so as to provide an automobile headlamp having an aperture smaller than that of a conventional automobile headlamp. As a result, the present inventors found that, for this purpose, the fluorescence emitting surface of the light emitting section must have an area of 3.2 $mm^2$ or less and an excitation power of the excitation light must be set to be 3 W or more.

According to this, a lower limit of an excitation density of the excitation light is set to 0.94 $W/mm^2$ (=3 W/3.2 $mm^2$), and an upper limit of the excitation density of the excitation light is set to 3.2 $W/mm^2$, at which the light emitting section can be maintained at a temperature of 300° C. or lower. This makes it possible to provide an automobile headlamp having an aperture smaller than that of a conventional automobile headlamp and being capable of outputting light equivalent to that outputted by the conventional automobile headlamp.

Thus, by configuring the light emitting device of the present invention as above, it is possible to provide a next-generation automobile headlamp having an aperture smaller than that of a conventional automobile headlamp and being capable of outputting light equivalent to that outputted by the conventional automobile headlamp.

Here, in a case involving use of (i) excitation light having a wavelength of 445 nm and (ii) a YAG fluorescent material, a part of the excitation light having the wavelength of 445 nm transmits through the fluorescent material and is emitted as illumination light with the same wavelength as that of the excitation light, which results in no loss caused by the fluorescent material. As for another part of the excitation not transmitting through the fluorescent material, a loss caused by the fluorescent material is small, because the YAG fluorescent material has an external quantum efficiency of as high as 90%. In this case, an excitation power required by the automobile headlamp is 3 W.

On the other hand, in a case involving use of (i) excitation light having a wavelength in an ultraviolet region and (ii) a fluorescent material which is not a YAG fluorescent material, e.g., an oxynitride fluorescent material, the whole of the excitation light having the wavelength in the ultraviolet region enters the fluorescent material and is converted into fluorescence, which results in a loss caused by the fluorescent material. Further, as compared with the YAG fluorescent material, the oxynitride fluorescent material has a lower external quantum efficiency, 60%. Therefore, with the oxynitride fluorescent material, a great loss occurs. In this case, an excitation power required by the automobile headlamp is 8 W.

Namely, the next-generation automobile headlamp requires an excitation power of 3 W to 8 W. Therefore, if the irradiated surface has an area of 3.2 $mm^2$, the excitation power density ranges from 0.94 $W/mm^2$ to 2.5 $W/mm^2$. Here, the present invention is configured so that the excitation power density is in a range from 0.94 $W/mm^2$ to 3.2 $W/mm^2$, and therefore it is possible to maintain the light emitting section at a temperature of 300° C. or lower. Thus, it is possible to provide a next-generation automobile headlamp.

Further, the present invention encompasses a vehicle headlamp including the above light emitting device.

Further, the present invention encompasses an illumination device including the above light emitting device.

The light emitting device of the present invention is suitably applicable to a vehicle headlamp, an illumination device, or the like. For example, assume that the light emitting device of the present invention is applied to the vehicle headlamp. Then, it is possible to provide a vehicle headlamp capable of (i) preventing, with a simple configuration, an increase in a temperature of a light emitting section and (ii) solving the previously-described conventional problems.

SUPPLEMENTAL INFORMATION

INDUSTRIAL APPLICABILITY

The present invention relates to a light emitting device capable of preventing, with a simple configuration, an increase in a temperature of a light emitting section. The present invention is suitably applicable to, in particular, vehicle headlamps, illumination devices, and vehicles.

REFERENCE SIGNS LIST

1 Headlamp (light emitting device)
2 Laser element (excitation light source)
3 Lens
4, 4*a* through 4*i* Light emitting section
5 Parabolic mirror (reflecting mirror)
5*a* Sign
5*b* Opening section
6 Window section
7, 7*a* through 7*j* Heat sink (heat releasing section)
10 Automobile (vehicle)
25 Needle (heat conductive member)
26 Wire (heat conductive member)
70, 70*a* through 70*j* Contact surface

The invention claimed is:

1. A light emitting device comprising:

an excitation light source for emitting excitation light;

a light emitting section, including a sealing material made from an inorganic material, for emitting fluorescence upon receiving the excitation light emitted from the excitation light source; and a heat releasing section having a contact surface and a bottom surface opposite from the contact surface, the contact surface of the heat releasing section being in contact with the light emitting section for releasing heat generated in the light emitting section in response to the excitation light emitted onto the light emitting section, wherein the light emitting section and the heat releasing section are provided so that the light emitting section is located entirely within a range of 0.2 mm or less from the contact surface, the excitation light source is a semiconductor laser and provided on a side of the bottom surface with respect to the heat releasing section, the heat releasing section is made of a rigid transparent material, the excitation light passes through the heat releasing section so that the light emitting section is irradiated with the excitation light, and the heat releasing section is placed between the excitation light source and the light emitting section so that the excitation light enters a light incident surface of the light emitting section and fluorescent light is released from a surface of the light emitting section, which is opposite from the light incident surface.

2. The light emitting device as set forth in claim 1, wherein:

the contact surface has recesses and protrusions.

3. The light emitting device as set forth in claim 1, wherein:

the light emitting section includes, in its inside, a heat conductive member capable of conducting heat to the heat releasing section.

4. The light emitting device as set forth in claim 1, wherein:

the light emitting section has a surface on which a heat conductive member is provided, at least one end of the heat conductive member extending to the heat releasing section.

5. The light emitting device as set forth in claim 1, wherein:

the heat releasing section has a plurality of through-holes arranged in a lattice pattern; and the light emitting section comprises a plurality of light emitting sections, and the plurality of light emitting sections are provided in the plurality of through-holes.

6. The light emitting device as set forth in claim 1, wherein:

the heat releasing section has a plurality of recesses arranged in a lattice pattern; and the light emitting section comprises a plurality of light emitting sections, and the plurality of light emitting sections are provided in the plurality of recesses.

7. The light emitting device as set forth in claim 1, wherein:

the contact surface is in contact with a plurality of surfaces of the light emitting section.

8. The light emitting device as set forth in claim 1, wherein:

the contact surface is in contact with an irradiated surface of the light emitting section onto which irradiated surface the excitation light is emitted; and at least a part of the heat releasing section is made from a high reflectance material which reflects the fluorescence emitted from the light emitting section, said part of the heat releasing section being the contact surface.

9. The light emitting device as set forth in claim 1, wherein:

the heat releasing section has a light-transmitting section which is in contact with the light emitting section; and the fluorescence is emitted from the light emitting section via the light-transmitting section.

10. The light emitting device as set forth in claim 3, wherein:

a percentage of (i) an area of the heat conductive member appearing on a fluorescence emitting surface of the light emitting section with respect to (ii) an area of the fluorescence emitting surface is 40% or less, the fluorescence emitting surface facing another surface of the light emitting section, the another surface of the light emitting section being in contact with the contact surface, and the fluorescence being emitted from the light emitting section via the fluorescence emitting surface.

11. The light emitting device as set forth in claim 4, wherein:

a percentage of (i) an area of the heat conductive member appearing on said surface of the light emitting section with respect to (ii) an area of said surface of the light emitting section is 40% or less, said surface not including a surface of the light emitting section which surface is in contact with the contact surface.

12. The light emitting device as set forth in claim 3, wherein:

the heat conductive member has higher heat conductivity than that of the sealing material which is included in the light emitting section in order to seal a fluorescent material.

13. The light emitting device as set forth in claim 3, wherein:

the heat conductive member is made from a transparent material.

14. The light emitting device as set forth in claim 5, wherein:

in a surface of the heat releasing section, a total area of the plurality of through-holes is 1.5 times or more larger than a total area of a region by which the plurality of through-holes are separated from each other.

15. The light emitting device as set forth in claim 6, wherein:

in a surface of the heat releasing section, a total area of the plurality of recesses is 1.5 times or more larger than a total area of a region by which the plurality of recesses are separated from each other.

16. The light emitting device as set forth in claim 1, wherein:

a relative positional relationship between the light emitting section and the heat releasing section is set so that a temperature of the light emitting section is 300° C. or lower when the excitation light has an excitation density which is within a range from 0.94 $W/mm^2$ to 3.2 $W/mm^2$.

17. A vehicle headlamp comprising a light emitting device recited in claim 1.

18. An illumination device comprising a light emitting device recited in claim 1.

19. A vehicle comprising a vehicle headlamp, the vehicle headlamp including:

an excitation light source for emitting excitation light;

a light emitting section, including a sealing material made from an inorganic material, for emitting fluorescence upon receiving the excitation light emitted from the excitation light source;

a reflecting mirror having a reflecting curved surface for reflecting the fluorescence emitted from the light emitting section; and a heat releasing section having a contact surface and a bottom surface opposite from the contact surface, the contact surface of the heat releasing section being in contact with the light emitting section for releasing heat generated in the light emitting section in response to the excitation light emitted onto the light emitting section, wherein the light emitting section and the heat releasing section are provided so that the light emitting section is located entirely within a range of 0.2 mm or less from the contact surface, the excitation light source is a semiconductor laser and provided on a side of the bottom surface with respect to the heat releasing section, the heat releasing section is made of a rigid transparent material, the excitation light passes through the heat releasing section so that the light emitting section is irradiated with the excitation light, the vehicle headlamp is mounted in the vehicle so that the reflecting curved surface is located on a lower side in a vertical direction, and the heat releasing section is placed between the excitation light source and the light emitting section so that the excitation light enters a light incident surface of the light emitting section and fluorescent light is released from a surface of the light emitting section, which is opposite from the light incident surface.

* * * * *